US012064662B2

(12) United States Patent
Bayerlein et al.

(10) Patent No.: US 12,064,662 B2
(45) **Date of Patent: *Aug. 20, 2024**

(54) DIFFERENTIAL AIR PRESSURE EXERCISE AND THERAPEUTIC DEVICE

(71) Applicant: Woodway USA, Inc., Waukesha, WI (US)

(72) Inventors: Douglas G. Bayerlein, Oconomowoc, WI (US); Nicholas A. Oblamski, Waukesha, WI (US); Vance E. Emons, Hartland, WI (US); Ben Peterson, Waukesha, WI (US); Derek T. Jordan, Waukesha, WI (US)

(73) Assignee: Woodway USA, Inc., Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,410

(22) Filed: Jan. 23, 2023

(65) Prior Publication Data

US 2023/0158363 A1 May 25, 2023

Related U.S. Application Data

(63) Continuation of application No. 17/101,806, filed on Nov. 23, 2020, now Pat. No. 11,559,720, which is a (Continued)

(51) Int. Cl.
*A63B 22/02* (2006.01)
*A61H 1/00* (2006.01)

(52) U.S. Cl.
CPC ........... *A63B 22/025* (2015.10); *A61H 1/005* (2013.01); *A61H 2201/0103* (2013.01); *A61H 2201/1215* (2013.01); *A61H 2201/5087* (2013.01)

(58) Field of Classification Search
CPC .... A63B 22/02–0292; A63B 21/00181; A63B 69/0064; A63B 2208/05; A61H 3/008
See application file for complete search history.

(56) References Cited

U.S. PATENT DOCUMENTS 5,133,339 A 7/1992 Whalen et al.
5,133,349 A 7/1992 Heinze
(Continued)

FOREIGN PATENT DOCUMENTS

CN 203663349 U 6/2014
DE 10 2010 004 504 A1 7/2011
(Continued)

OTHER PUBLICATIONS

U.S. Appl. No. 15/963,960, filed Apr. 26, 2018, Whalen et al.
(Continued)

*Primary Examiner* — Jennifer Robertson
(74) *Attorney, Agent, or Firm* — Foley & Lardner LLP

(57) ABSTRACT

An offloading system for use with a treadmill includes an air chamber configured to be selectively inflated between a deflated condition and an inflated, operating condition, a user seal coupled to the air chamber and adapted to receive a user so that, in the operating condition, at least a portion of the user is received in the user seal and positioned within the air chamber, a pump operable to inflate the air chamber, and a controller configured to determine an occurrence of a loss of pressure in the air chamber and, in response to the occurrence, cause a reduction of speed of a running belt of the treadmill.

18 Claims, 21 Drawing Sheets

Related U.S. Application Data continuation of application No. 16/278,619, filed on Feb. 18, 2019, now Pat. No. 10,843,036.

(60) Provisional application No. 62/632,310, filed on Feb. 19, 2018.

(56) References Cited

U.S. PATENT DOCUMENTS

| | | | | |
|---|---|---|---|---|
| 5,174,590 | A | 12/1992 | Kerley et al. | |
| 5,389,055 | A | 2/1995 | Gangloff | |
| 5,685,804 | A | 11/1997 | Whan-Tong et al. | |
| 6,045,489 | A | 4/2000 | Levine et al. | |
| 6,110,048 | A | 8/2000 | Murray | |
| 6,146,313 | A | 11/2000 | Whan-Tong et al. | |
| 6,302,829 | B1 | 10/2001 | Schmidt | |
| 6,419,611 | B1 | 7/2002 | Levine et al. | |
| 6,439,250 | B1 | 8/2002 | Balan | |
| 6,461,280 | B1 | 10/2002 | Benedikter | |
| 6,539,946 | B2 | 4/2003 | Weyergans | |
| 6,675,820 | B2 | 1/2004 | Balan | |
| 6,689,075 | B2 | 2/2004 | West | |
| 6,749,540 | B1 | 6/2004 | Pasero et al. | |
| D495,384 | S | 8/2004 | Rolfes | |
| 6,783,482 | B2 | 8/2004 | Oglesby et al. | |
| D497,961 | S | 11/2004 | Rolfes | |
| 6,835,167 | B2 | 12/2004 | Schmidt | |
| 6,939,271 | B1 | 9/2005 | Whan-Tong et al. | |
| D515,153 | S | 2/2006 | Rolfes | |
| 7,141,007 | B2 | 11/2006 | Egger | |
| 7,179,205 | B2 | 2/2007 | Schmidt | |
| 7,189,193 | B2 | 3/2007 | Egger | |
| 7,591,795 | B2 | 9/2009 | Whalen et al. | |
| 7,641,597 | B2 | 1/2010 | Schmidt | |
| 7,762,930 | B2 | 7/2010 | Egger | |
| 7,837,597 | B2 | 11/2010 | Reyes et al. | |
| D633,156 | S | 2/2011 | Caswell et al. | |
| 8,273,114 | B2 | 9/2012 | Wasowski | |
| 8,464,716 | B2 | 6/2013 | Kuehne et al. | |
| D695,856 | S | 12/2013 | Jacobs et al. | |
| 8,840,572 | B2 | 9/2014 | Whalen et al. | |
| 8,864,627 | B2 | 10/2014 | Bayerlein et al. | |
| 8,900,098 | B2 | 12/2014 | Egan | |
| 9,272,175 | B2 | 3/2016 | Egan | |
| 9,642,764 | B2 | 5/2017 | Kuehne et al. | |
| 9,883,967 | B2 | 2/2018 | Wasowski | |
| 10,004,656 | B2 | 6/2018 | Whalen et al. | |
| 10,265,565 | B2 | 4/2019 | Jue et al. | |
| 10,342,461 | B2 | 7/2019 | Basta et al. | |
| 10,843,036 | B2 * | 11/2020 | Bayerlein | A63B 22/025 |
| 11,559,720 | B2 * | 1/2023 | Bayerlein | A63B 69/0064 |
| 11,806,564 | B2 | 11/2023 | Basta et al. | |
| 2004/0043877 | A1 | 3/2004 | Brown | |
| 2007/0004562 | A1 | 1/2007 | Pan et al. | |
| 2009/0014004 | A1 | 1/2009 | Whalen et al. | |
| 2009/0082700 | A1 | 3/2009 | Whalen et al. | |
| 2011/0098157 | A1 | 4/2011 | Whalen et al. | |
| 2011/0098615 | A1 | 4/2011 | Whalen et al. | |
| 2011/0120567 | A1 * | 5/2011 | Kuehne | A63B 21/00181 601/1 |
| 2012/0238921 | A1 * | 9/2012 | Kuehne | A63B 71/0009 601/5 |
| 2012/0277643 | A1 | 11/2012 | Whalen et al. | |
| 2014/0194252 | A1 | 7/2014 | Arimoto et al. | |
| 2015/0011917 | A1 | 1/2015 | Whalen et al. | |
| 2015/0379239 | A1 | 12/2015 | Basta et al. | |
| 2016/0000155 | A1 | 1/2016 | Marecek et al. | |
| 2016/0001118 | A1 | 1/2016 | Kuehne et al. | |
| 2016/0001119 | A1 | 1/2016 | Jue et al. | |
| 2016/0007885 | A1 | 1/2016 | Basta et al. | |
| 2016/0008650 | A1 | 1/2016 | Jue et al. | |
| 2016/0073704 | A1 | 3/2016 | Basta et al. | |
| 2016/0242993 | A1 | 8/2016 | Whalen et al. | |
| 2017/0014295 | A1 | 1/2017 | Whalen et al. | |
| 2017/0128769 | A1 | 5/2017 | Long et al. | |
| 2017/0367916 | A1 | 12/2017 | Kuehne et al. | |
| 2019/0083843 | A1 | 3/2019 | Del Monaco et al. | |
| 2019/0083844 | A1 | 3/2019 | Bayerlein et al. | |

FOREIGN PATENT DOCUMENTS

| | | | |
|---|---|---|---|
| JP | 2002-360644 | | 12/2002 |
| WO | WO-2007/038793 | | 4/2007 |
| WO | WO-2009/051750 | A1 | 4/2009 |
| WO | WO-2009/051765 | A1 | 4/2009 |
| WO | WO-2010/132550 | A1 | 11/2010 |
| WO | WO-2012/129125 | | 9/2012 |
| WO | WO-2014/138228 | A1 | 9/2014 |
| WO | WO-2014/138281 | A1 | 9/2014 |
| WO | WO-2014/138313 | A1 | 9/2014 |
| WO | WO-2014/152862 | A1 | 9/2014 |
| WO | WO-2014/153016 | A1 | 9/2014 |
| WO | WO-2014/153088 | A1 | 9/2014 |
| WO | WO-2014/153201 | A1 | 9/2014 |
| WO | WO-2015/195983 | A1 | 12/2015 |

OTHER PUBLICATIONS

U.S. Appl. No. 15/993,136, filed May 30, 2018, Kuehne et al.

U.S. Appl. No. 16/254,503, filed Jan. 22, 2019, Basta et al.

"Review of the Alter-G 'G-Trainer'", Mar. 4, 2008, http://www.gadgetking.com/2008/03/04/review-of-the-alter-g-g-trainer/, 6 pages.

Burgar et al., "Differential Walking Assist: An Inflatable Walking Support", 1994, 2 pages.

Dunlap, Scott, "A Trail Runner's Blog: Alter-G Anti-Gravity Training—My First Hand Experience", Aug. 16, 2006, http://www.atrailrunnersblog.com/2006/08/alter-g-anti-gravity-training-my-first.html, 11 pages.

Extended European Search Report for Application No. EP 19754219.4 mailing date Jul. 20, 2021, 16 pages.

Ford et al., "Arm constraint and Walking in Healthy Adults", Gait & Posture 26, Aug. 2006, pp. 135-141.

Hornby et al, "Robotic-Assisted Body-Weight-Supported Treadmill Training in Individuals Following Motor Incomplete Spinal Cord Injury", vol. 85, No. 1, Jan. 2005, pp. 52-66.

International Search Report and Written Opinion for International Application No. PCT/US2019/018429, mail date Jun. 7, 2019, 11 pages.

Jezernik et al., "Automatic Gait-Pattern Adaptation Algorithms for Rehabilitation With a 4-DOF Robotic Orthosis", IEEE Transaction on Robotics and Automation, vol. 20, No. 3, Jun. 2004, pp. 574-582.

Partial European Search Report for Application No. EP 19754219.4 mailing date Mar. 5, 2021 16 pages.

Riener et al., "Patient-Cooperative Strategies for Robot-Aided Treadmill Training: First Experimental Results", IEEE Transactions on Neural Systems and Rehabilitation Engineering, vol. 13, No. 3, Sep. 2005, pp. 380-394.

Wilson et al., "Equipment Specifications for Supported Treadmill Ambulation Training", Journal of Rehabilitation Research and Development, vol. 37, No. 4, Jul./Aug. 2000, pp. 415-422.

* cited by examiner

106

900

RECOMMENDED ASSISTANCE LEVELS

| ASSISTANCE (% OF USER WEIGHT) | USER WEIGHT (lbs) | | | | | | | | | | |
|---|---|---|---|---|---|---|---|---|---|---|---|
| | 100 | 125 | 150 | 175 | 200 | 225 | 250 | 275 | 300 | 325 | 350 |
| 20% | 1 | 1 | 2 | 3 | 3 | 4 | 5 | 6 | 6 | 7 | 7 |
| 25% | 1 | 2 | 3 | 3 | 4 | 5 | 5 | 6 | 7 | 8 | 8 |
| 30% | 2 | 3 | 3 | 4 | 4 | 5 | 6 | 7 | 7 | 8 | 9 |
| 35% | 2 | 3 | 4 | 5 | 5 | 6 | 7 | 7 | 8 | 9 | 10 |
| 40% | 3 | 4 | 5 | 6 | 6 | 7 | 8 | 8 | 9 | 10 | 11 |
| 45% | 4 | 4 | 5 | 6 | 7 | 8 | 8 | 9 | 9 | 10 | 12 |
| 50% | 5 | 5 | 6 | 7 | 8 | 8 | 9 | 10 | 10 | 11 | 13 |
| 55% | 5 | 6 | 7 | 8 | 9 | 9 | 10 | 10 | 11 | 12 | 13 |
| 60% | 6 | 6 | 7 | 8 | 9 | 10 | 10 | 11 | 11 | 13 | 14 |
| 65% | 6 | 7 | 8 | 9 | 10 | 10 | 11 | 11 | 12 | 13 | 14 |
| 70% | 7 | 8 | 9 | 9 | 11 | 11 | 11 | 12 | 12 | 14 | 15 |
| 75% | 7 | 8 | 9 | 9 | 11 | 11 | 11 | 12 | 12 | 14 | 15 |
| 80% | 8 | 9 | 10 | 10 | 12 | 12 | 13 | 13 | 14 | 15 | 17 |

FIG. 9

106

902

910

RECOMMENDED ASSISTANCE LEVELS

USER HEIGHT: 5' 6" WAIST SIZE: 32" HEIGHT SETTING: 4

| ASSISTANCE (% OF USER WEIGHT) | USER WEIGHT (lbs) 100 | 125 | 150 | 175 | 200 | 225 | 250 | 275 | 300 | 325 | 350 |
|---|---|---|---|---|---|---|---|---|---|---|---|
| 20% | 1 | 1 | 2 | 3 | 3 | 4 | 5 | 6 | 6 | 7 | 7 |
| 25% | 1 | 2 | 3 | 3 | 4 | 5 | 5 | 6 | 7 | 8 | 8 |
| 30% | 2 | 3 | 3 | 4 | 4 | 5 | 6 | 7 | 7 | 8 | 9 |
| 35% | 2 | 3 | 4 | 5 | 5 | 6 | 7 | 7 | 8 | 9 | 10 |
| 40% | 3 | 4 | 5 | 6 | 6 | 7 | 8 | 8 | 9 | 10 | 11 |
| 45% | 4 | 4 | 5 | 6 | 7 | 8 | 8 | 9 | 9 | 10 | 12 |
| 50% | 5 | 5 | 6 | 7 | 8 | 8 | 9 | 10 | 10 | 11 | 13 |
| 55% | 5 | 6 | 7 | 8 | 9 | 9 | 10 | 10 | 11 | 12 | 13 |
| 60% | 6 | 6 | 7 | 8 | 9 | 10 | 10 | 11 | 11 | 13 | 14 |
| 65% | 6 | 7 | 8 | 9 | 10 | 10 | 11 | 11 | 12 | 13 | 14 |
| 70% | 7 | 8 | 9 | 9 | 11 | 11 | 11 | 12 | 12 | 14 | 15 |
| 75% | 7 | 9 | 10 | 10 | 11 | 11 | 12 | 12 | 13 | 14 | 16 |
| 80% | 8 | 9 | 10 | 10 | 12 | 12 | 13 | 13 | 14 | 15 | 17 |

FIG. 10

106

904

912

| USER WEIGHT 175lbs | RECOMMENDED ASSISTANCE LEVELS | | | | | | | | |
|---|---|---|---|---|---|---|---|---|---|
| | HEIGHT SETTING | | | | | | | | |
| ASSISTANCE (% OF USER WEIGHT) | 1 | 2 | 3 | 4 | 5 | 6 | 7 | 8 | 9 |
| 20% | 1 | 1 | 2 | 3 | 3 | 4 | 5 | 6 | 6 |
| 25% | 1 | 2 | 3 | 3 | 4 | 5 | 5 | 6 | 7 |
| 30% | 2 | 3 | 3 | 4 | 4 | 5 | 6 | 7 | 7 |
| 35% | 2 | 3 | 4 | 5 | 5 | 6 | 7 | 7 | 8 |
| 40% | 3 | 4 | 5 | 6 | 6 | 7 | 8 | 8 | 9 |
| 45% | 4 | 4 | 5 | 6 | 7 | 8 | 8 | 9 | 9 |
| 50% | 5 | 5 | 6 | 7 | 8 | 8 | 9 | 10 | 10 |
| 55% | 5 | 6 | 7 | 8 | 9 | 9 | 10 | 10 | 11 |
| 60% | 6 | 6 | 7 | 8 | 9 | 10 | 10 | 11 | 11 |
| 65% | 6 | 7 | 8 | 9 | 10 | 10 | 11 | 11 | 12 |
| 70% | 7 | 8 | 9 | 9 | 11 | 11 | 11 | 12 | 12 |
| 75% | 7 | 9 | 10 | 10 | 11 | 11 | 12 | 12 | 13 |
| 80% | 8 | 9 | 10 | 10 | 12 | 12 | 13 | 13 | 14 |

*FIG. 11*

106

906

| ASSISTANCE (% OF USER WEIGHT) | MAXIMUM RECOMMENDED ASSISTANCE LEVELS USER WEIGHT (lbs) | | | | | | | | | | |
|---|---|---|---|---|---|---|---|---|---|---|---|
| | 100 | 125 | 150 | 175 | 200 | 225 | 250 | 275 | 300 | 325 | 350 |
| 58" | 8 | 8 | 9 | 10 | 10 | 11 | 12 | 13 | 13 | 14 | 14 |
| 60" | 8 | 9 | 10 | 10 | 11 | 12 | 12 | 13 | 14 | 15 | 15 |
| 62" | 9 | 10 | 10 | 11 | 11 | 12 | 13 | 14 | 14 | 15 | 16 |
| 64" | 9 | 10 | 11 | 12 | 12 | 13 | 14 | 14 | 15 | 16 | 17 |
| 66" | 10 | 11 | 12 | 13 | 13 | 14 | 15 | 15 | 16 | 17 | 18 |
| 68" | 11 | 11 | 12 | 13 | 14 | 15 | 15 | 16 | 16 | 17 | 19 |
| 70" | 12 | 12 | 13 | 14 | 15 | 15 | 16 | 17 | 17 | 18 | 20 |
| 72" | 12 | 13 | 14 | 15 | 16 | 16 | 17 | 17 | 18 | 19 | 20 |
| 74" | 13 | 13 | 14 | 15 | 16 | 17 | 17 | 18 | 18 | 20 | 20 |
| 76" | 13 | 14 | 15 | 16 | 17 | 17 | 18 | 18 | 19 | 20 | 20 |
| 78" | 14 | 15 | 16 | 16 | 18 | 18 | 18 | 19 | 19 | 20 | 20 |
| 80" | 14 | 16 | 17 | 17 | 18 | 18 | 19 | 19 | 20 | 20 | 20 |
| 82" | 15 | 16 | 17 | 17 | 19 | 19 | 20 | 20 | 20 | 20 | 20 |

FIG. 12

DIFFERENTIAL AIR PRESSURE EXERCISE AND THERAPEUTIC DEVICE

CROSS-REFERENCE TO RELATED APPLICATIONS

This application is a continuation of U.S. application Ser. No. 17/101,806, filed Nov. 23, 2020, which is a continuation of U.S. patent application Ser. No. 16/278,619, filed Feb. 18, 2019, which claims the benefit of and priority to U.S. Provisional Patent Application No. 62/632,310, filed Feb. 19, 2018, all of which are incorporated by reference herein in their entireties.

TECHNICAL FIELD

The present disclosure relates generally to the field of exercise and therapeutic devices.

BACKGROUND

In general, a treadmill includes a moving belt that allows a user to walk or run on the treadmill while the user remains in a substantially stationary position. Treadmills are effective to provide exercise and therapeutic benefits to a user. For rehabilitation, physical therapy, or other purposes, some treadmills include a system that reduces or offloads the weight of the user to lighten the load that the user supports while using the treadmill. Beneficially, this system reduces the force of each repeated impact between the user and the treadmill. Such a system may be beneficial for users who are rehabilitating injuries where repeated impacts with the treadmill running belt may adversely affect their limbs or joints.

SUMMARY

One implementation of the present disclosure is an exercise and therapeutic device. The exercise and therapeutic device includes a treadmill comprising a running belt coupled to a treadmill frame and an offloading system coupled to the treadmill. The offloading system includes an air chamber surrounding the running belt adapted to be selectively inflated between a deflated condition and an inflated, operating condition, a user seal coupled to the air chamber, adapted to receive a user so that, in an operating condition, at least a portion of a user is received in the user seal and positioned within the air chamber and to seal the air chamber around the user, a pump operable to inflate the air chamber, at least one strap coupled to the treadmill frame and adapted to restrict the expansion of the air chamber in an operating condition and adjust a spacing of the user seal relative to a running surface of the running belt when the air chamber is inflated in the operating condition.

Another implementation of the present disclosure is an exercise and therapeutic device. The exercise and therapeutic device includes a treadmill, which includes a running belt coupled to a frame, and an offloading system coupled to the treadmill. The offloading system comprising an air chamber surrounding the running belt, a user seal coupled to the air chamber and configured to allow a user to extend at least partially into the air chamber and to seal the air chamber around the user, a pump operable to inflate the air chamber, a plurality of straps coupled to the frame, and a user seal frame coupled to the plurality of straps and configured to restrict a distance between the user seal and a running surface of the running belt when the air chamber is inflated. Changing a length of the plurality of straps changes the height of the user seal when the air chamber is inflated.

Another implementation of the present disclosure is an exercise and therapeutic device. The exercise and therapeutic device includes a treadmill, which includes a running belt coupled to a treadmill frame, and an offloading system coupled to the treadmill. The offloading system includes an air chamber at least partially surrounding the running belt, a user seal coupled to the air chamber and configured to receive at least a portion of a body of a user so that in an operating condition, at least a portion of a user is positioned within the air chamber and to substantially seal the air chamber around a user, a pump operable to selectively inflate the air chamber, a user seal frame configured to substantially surround the user seal. The exercise device also includes a rear actuator column coupled to the treadmill frame. The rear actuator column includes a first shaft configured to couple to the user seal frame and a first actuator controllable to adjust a position of the first shaft relative to a running surface of the running belt.

Another implementation of the present disclosure is an exercise device including a treadmill and an offloading system coupled to the treadmill. The treadmill includes a treadmill frame, a running belt coupled to a treadmill frame, and a motor coupled to the running belt. The offloading system includes an air chamber at least partially surrounding the running belt, a user seal coupled to the air chamber and configured to selectively receive at least a portion of a user so that, in an operating condition, at least a portion of a user extends at least partially into the air chamber and to seal the air chamber around a user, and a pump operable to selectively inflate the air chamber. The exercise device includes a controller coupled to the motor and the pump and configured to concurrently control the motor and the pump.

BRIEF DESCRIPTION OF THE FIGURES

FIGS. 9-12 are depictions of charts that provide guidance to a user or other person(s), such as a physical therapist, for operating the exercise and therapeutic device of FIG. 1, according to exemplary embodiments.

DETAILED DESCRIPTION

Figure 1:
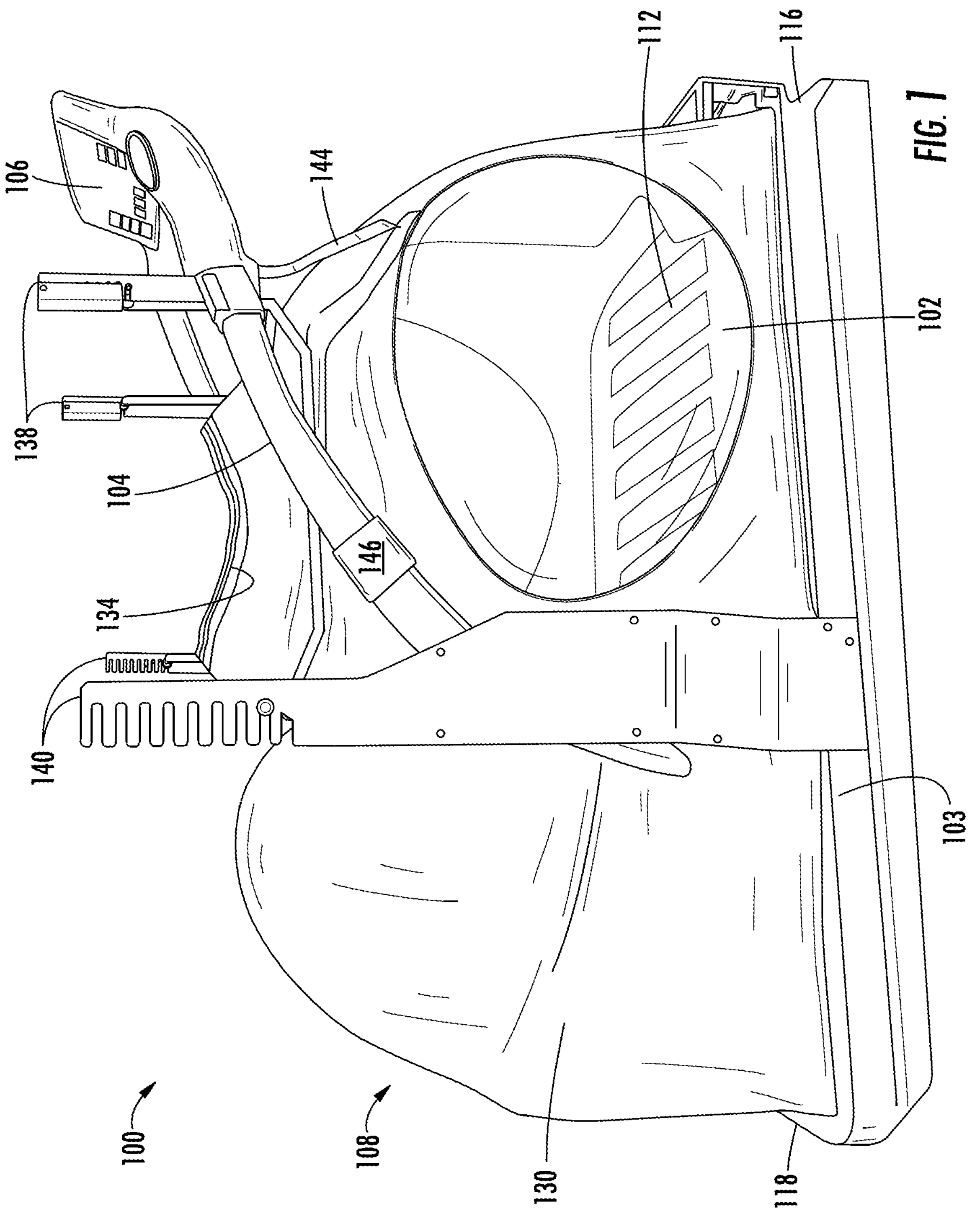
FIG. 1 is a side perspective view of an exercise and therapeutic device, according to an exemplary embodiment.
Figure 2:
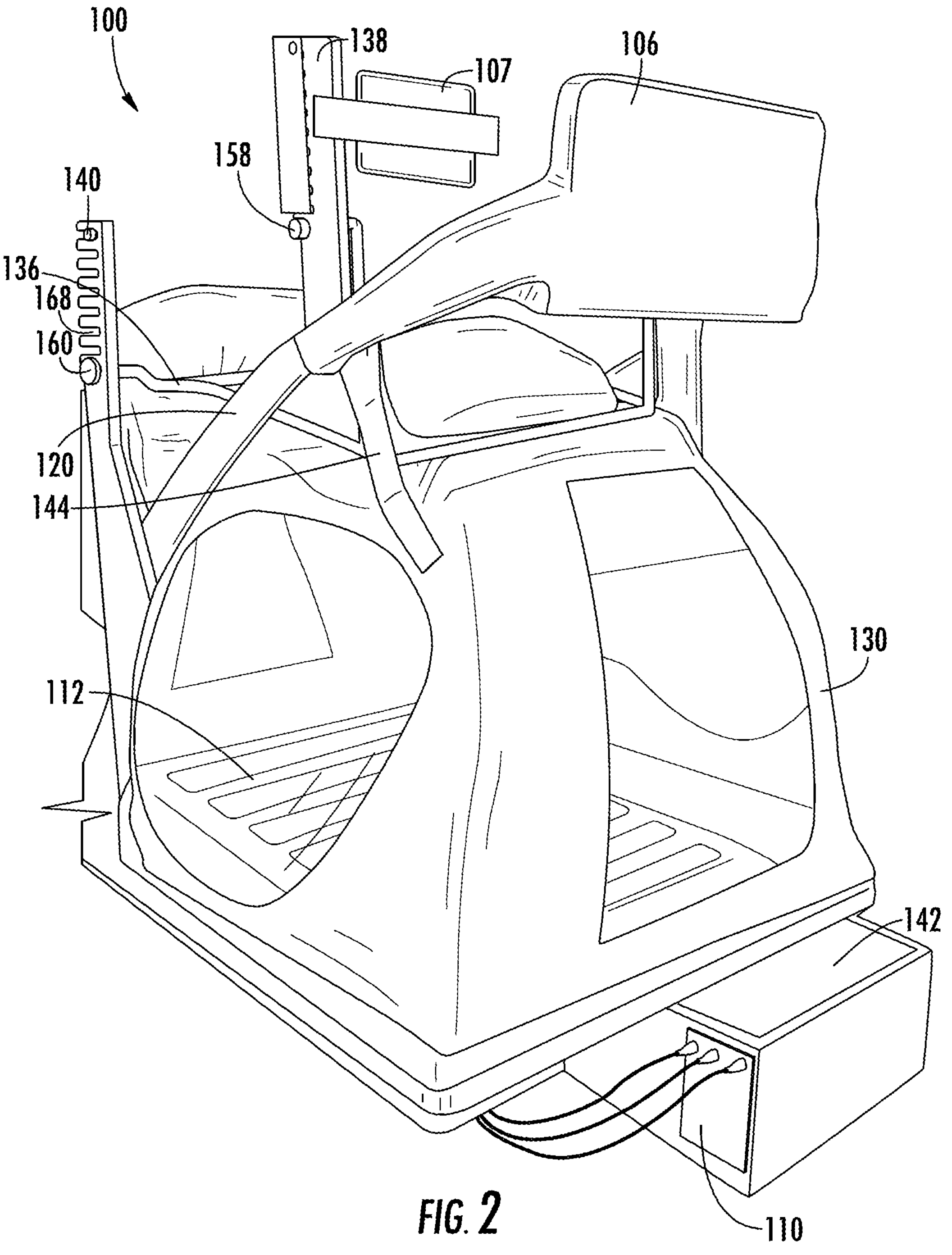
FIG. 2 is a front perspective view of the exercise and therapeutic device of FIG. 1, according to an exemplary embodiment.
Figure 4:
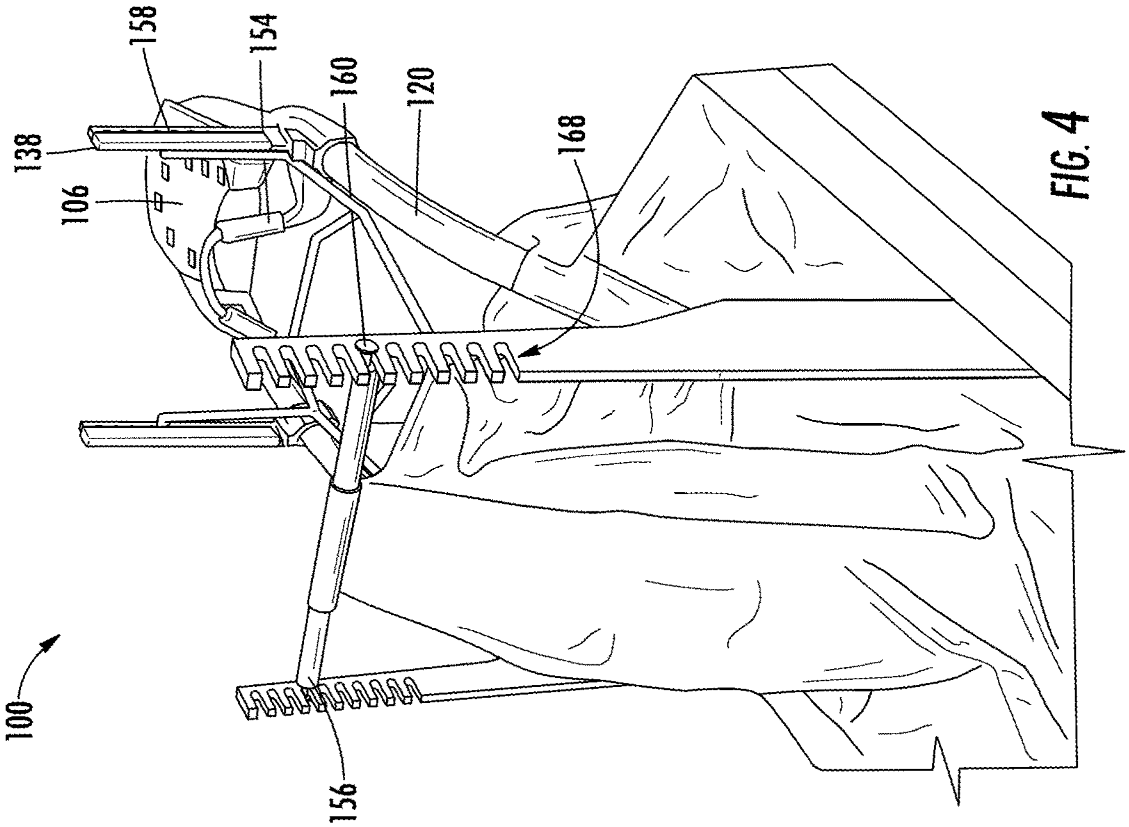
FIG. 4 is another partial perspective view of the exercise and therapeutic device of FIG. 1 with the air chamber in a deflated condition, according to an exemplary embodiment.
Figure 3:
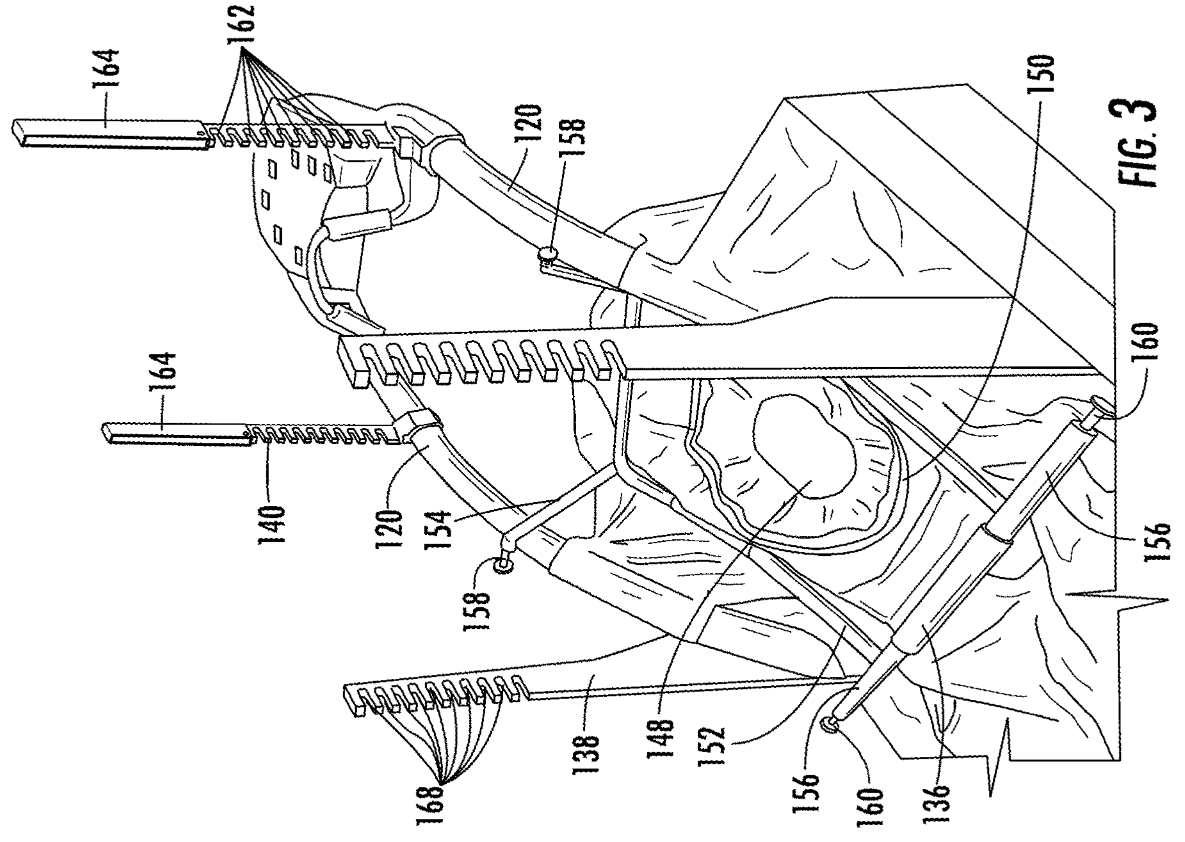
FIG. 3 is a partial perspective view of the exercise and therapeutic device of FIG. 1 with the air chamber in a deflated condition, according to an exemplary embodiment.

Referring now to FIGS. 1-4, an exercise and therapeutic device 100 is shown in an inflated state, according to an exemplary embodiment. The exercise and therapeutic device 100 includes a treadmill and an offloading system which, in general, beneficially supports at least a portion of the user's body weight while the user walks, jogs, runs, or otherwise uses the treadmill. As a result, the weight reduction or offloading system reduces the stresses and forces experienced by the user during use of the treadmill. The exercise and therapeutic device 100 is therefore well suited for rehabilitation and injury prevention applications. However, the exercise and therapeutic device 100 is also well suited for exercise applications (e.g., cardiovascular exercises, workout programs, training programs, and the like). As shown, the exercise and therapeutic device 100 includes a treadmill 102 having a treadmill frame 103, a handrail assembly 104 coupled to the frame (e.g., handrail structure, guide rail, etc.), a user console 106 coupled to the treadmill frame 103, an offloading system 108 including an air chamber 130 coupled to the treadmill 102, and a controller 110. FIGS. 1-2 show the exercise and therapeutic device 100 with the air chamber 130 in an inflated condition, while FIGS. 3-4 show the exercise and therapeutic device 100 with the air chamber 130 in a deflated condition.

Treadmill 102 includes a running belt 112 coupled to the frame 103 and a treadmill motor 114 (shown in FIG. 7) adapted to drive rotation of the running belt 112. In the embodiment shown, the running belt 112 is structured as a slatted running belt including a pair of endless or continuous loops with a plurality of slats that couple to each endless loop. The slats are positioned substantially perpendicular to the longitudinal length of the treadmill 102. The endless loops may engage with front and rear running belt pulleys (not shown). In another embodiment, the running belt 112 is a continuous loop running belt and the running belt 112 is driven or rotated by the treadmill motor 114. The treadmill motor 114 is controllable by the controller 110 to rotate the running belt 112 at various speeds in a longitudinal direction, simulating movement of the running surface from a front end 116 of the treadmill 102 to a rear end 118 of the treadmill 102. The treadmill 102 is thereby configured to allow a user to walk, jog, run, etc. on the treadmill 102 towards the front end 116 at various speeds while remaining stationary relative to the exercise and therapeutic device 100 and the surrounding environment. In some embodiments, the treadmill motor is also configured to rotate or allow rotation of the running belt 112 in the reverse direction to allow a user to walk, jog, run, etc. backwards (i.e., towards the rear end 118) while remaining stationary relative to the exercise and therapeutic device 100. In an alternate embodiment, the running belt 112 may be manually powered or driven (i.e., motor-less, where rotation of the running belt 112 is caused solely by the user).

The treadmill frame 103 is an assembly of elements such as longitudinally-extending, opposing side members. The treadmill frame 103 is structured to support a front shaft assembly positioned near a front end of the frame, and a rear shaft assembly positioned near the rear end of frame. In some embodiments, a first plurality of bearings are coupled to and extend generally longitudinally along the first (e.g., right) side member of the frame, while a second plurality of bearings are coupled to and extend generally longitudinally along the second (e.g., left-hand) side member of the frame. The pluralities of bearings are substantially opposite each other about the longitudinal axis of the treadmill 102. The treadmill frame 103 may support, at least partly, many of the components described herein, such as the running belt 112, handrail assembly 104, and so on. In some embodiments, the treadmill frame 103 is supported on a base that includes actuators controllable to vary an inclination of the treadmill 102.

The handrail assembly 104 as shown in FIGS. 1-4 includes substantially parallel guiderails 120 that extend from proximate the rear end 118 of the treadmill 102 towards the front end 116. The handrail assembly 104 is coupled to the treadmill frame 103. A user may grasp or otherwise engage with the handrail assembly 104 during usage of the device 100 to at least partly support or stabilize himself or herself during use of the treadmill.

The user console 106 (e.g., input/output device, display device, etc.) is coupled to the treadmill frame 103 and is positioned proximate the front end 116 of the treadmill 102, and vertically above the running belt 112. Particularly, the user console 106 is disposed at a vertical height and orientation suitable for interaction with a user standing, walking, running, and otherwise using the device 100. The user console 106 is configured to provide information about operation of the exercise and therapeutic device 100 to a user and to receive one or more inputs from a user relating to operation of the exercise and therapeutic device 100. According to various embodiments, the user console 106 includes one or more of a touch-screen display, a digital display, buttons, knobs, number pads, switches, speakers, and/or other input or output devices. In certain embodiments, the user console 106 includes one or more jacks/ports (e.g., USB, headphone jack, power adapter, etc.) that facilitate the coupling of remote devices (e.g., headphones, phones, tablets, etc.) with the user console 106 and exercise and therapeutic device 100. The user console 106 is coupled to the controller 110, such that information may be exchanged with the controller 110. In the example of FIG. 2, the device 100 is shown to also include a second display screen 107. In such an embodiment, the second interface device 107 can display information and receive user inputs relating to operation of the offloading system 108 while the user console 106 can display information and receive user inputs relating to operation of the treadmill motor 114.

In some embodiments, the treadmill 102 is configured in accordance with the disclosure of U.S. patent application Ser. No. 14/832,708, filed Aug. 21, 2015, the entire disclosure of which is incorporated by reference herein. For example, the running belt of the treadmill 102 may have a curved shape/running surface (i.e., a non-planar running surface). The running belt may be constructed from slats and endless loops and supported, at least partially, by longitudinally extending pluralities of bearings coupled to the treadmill frame in accord with this application. In such embodiments, the motor 114 may be omitted, such that the treadmill 102 is manually powered (i.e., rotation of the running belt is caused solely from manual power). A measurement of the speed of the treadmill 102 may be used as an input to a control strategy, therapy routine, etc. for the offloading 108.

In some embodiments, the treadmill 102 is configured in accordance with the disclosure of or U.S. patent application Ser. No. 15/966,598, filed Apr. 30, 2018, the entire disclosure of which is incorporated by reference herein in its entirety. For example, the treadmill 102 may include an electrical power generator coupled to the running belt 112 and configured to convert rotational motion of the running belt 112 into electrical power. In such embodiments, the electrical power generated by the electrical power generator can be used to power one or more components of the exercise and therapeutic device 100, such as the pump 142 described below. Accordingly, in such embodiments, the treadmill 102 is configured to provide some or all of the electrical power consumed by the offloading system 108. This configuration may be beneficial in environments where conservation of energy is desired, such that electrical power for the device 100 is not completely provided by a wall outlet or other external power source.

In some embodiments, the treadmill 102 is configured in accordance with the disclosure of U.S. patent application Ser. No. 15/640,180, filed Jun. 30, 2018, the entire disclosure of which is incorporated by reference herein. For example, the treadmill 102 may be configured to provide a non-motorized mode, a motorized mode, a brake mode, and a torque mode as described therein. By providing the non-motorized mode, motorized mode, brake mode, and/or torque mode in combination with weight offloading provided by the offloading system 108 as described below, a wide variety of therapeutic options may be provided, for example as part of a therapy routine described below with reference to FIGS. 7-8. For example, the controller (described below) is configured to provide a control instruction or signal to the motor to output a braking torque according to the processes described in the aforementioned referenced application. The braking torque is applied to the running belt. As a result, rotational movement of the running belt is restricted. This resistive mode of operation of the treadmill may be beneficial for users of the device 100 for strength training via the resistive mode while at least some of their weight is offloaded, which may reduce stresses from impacts associated with using the treadmill.

The offloading system 108 (weight offloading system, harnessing system, suspension system, and the like) is configured to offload a user's weight (or a portion thereof) while the user is using the exercise and therapeutic device 100. In this regard, the offloading system 108 at least partially supports a user above the treadmill 102 to offload a portion of the user's weight (i.e., to bear a portion of the user's weight), which in turn reduces the impact forces and stresses experienced by the user as the user walks, runs, and otherwise uses the exercise and therapeutic device 100. While the person is partially supported, suspended, offloaded, etc., it should be understood that the user is still in contact/capable of being contact with the treadmill 102, particularly, the running belt 112. The offloading system 108 includes a fluid or air chamber 130 (e.g., air chamber, inflatable enclosure, etc.) that is selectively inflatable/deflatable, a user seal 134 coupled to the chamber 130, a user seal frame 136 positioned adjacent to the chamber 130, a pair of front racks 138 (e.g., front ladders) and a pair of rear racks 140 (e.g., rear ladders) positioned adjacent to the chamber 130, and a pump 142 fluidly coupled to the air chamber 130. As described in detail below, the air chamber 130 is selectively inflated by the pump 142 to support a user sealed into the user seal 134 at a height determined in part by the position of the user seal frame 136 on the front racks 138 and the rear racks 140, while the user's lower body extends into the air chamber 130 to walk, run, etc. on the treadmill 102.

As shown, the air chamber 130 surrounds the running belt 112. The air chamber 130 may also surround one or more other components of the exercise and therapeutic device 100. The air chamber 130 is coupled to the treadmill frame 103. In particular, the air chamber 130 is coupled to the handrail assembly 104 by, in this example, straps 144 and loops 146. The straps 144 couple the air chamber 130 to the handrail assembly 104 proximate the front end 116, where the coupling point is vertically below the user console 106. While the air chamber 130 is deflated, the straps 144 at least partially suspend, lift, or otherwise hold the air chamber 130 up to prevent the air chamber 130 from collapsing upon itself in an adverse manner that could cause damage to the air chamber 130. Thus, the use of the straps 144 may improve durability of the air chamber 130 through repeated uses of the device 100. In other embodiments, different coupling mechanisms between the air chamber 130 and the frame 103 may be used (e.g., Velcro, cables/wires, etc.), such that the depicted implementation is not meant to be limiting. In an alternate embodiment, the use of straps or another device to hold, at least partially, the air chamber up above the treadmill base when the air chamber is deflated or substantially deflated is excluded.

The air chamber 130 is structured to be flexible and substantially resistant to stretching. In particular, the air chamber 130 includes a substantially air impermeable membrane that prevents air from passing therethrough. As such, upon inflation, the air chamber 130 retains/holds or substantially retains the air that is pumped into the air chamber 130 to create an area of increased air pressure which is used to at least partially offload some weight of the user. The air chamber 130 may be constructed from any one or more of a variety of materials including, but not limited to, vinyl, rubber, plastic, and/or any combination thereof In the example shown, the air chamber 130 includes a plurality of windows that facilitate other non-users (and, the user) to peer into the air chamber 130 while the user is using the device 100. Beneficially and for therapeutic uses, others (e.g., physicians, physical therapists) may then observe, catalog, diagnose, and otherwise track, e.g., gait or rehabilitation progress of the user. In an alternate embodiment, the windows are removed such that the air chamber 130 is non-see through.

The user seal 134 defines an opening 148 in the air chamber 130 and includes a sealing element or sealer 150. When the air chamber 130 is inflated, the opening 148 may be positioned substantially centrally above the running belt 112 (i.e., above a midpoint of a longitudinal length of a running surface and above a midpoint of the width of the running surface) and is configured to allow a portion of a user's body, for example a user's feet, legs, and hips, to pass through the opening 148 into the air chamber 130 while the remainder of the user remains outside the chamber. The opening 148 may be substantially circular as shown, or may be any other shape suitable to receiving a user. The sealer 150 is configured to create a substantially air-tight seal between the user and the air chamber 130 to prevent the flow of air through the opening 148. More particularly, the sealer 150 couples user shorts 300 (shown in FIG. 5 and described in detail with reference thereto) to the air chamber 130, while the user shorts 300 are configured to substantially seal around the user's body. In the embodiment shown, the sealer 150 is a zipper which mates with a complementary zipper of the user shorts 300 (e.g., zipper 304 shown in FIG. 5). A flap or other covering may be included to cover the zippers to reduce a rate of air leakage through the zippers. In other embodiments, the sealer 150 is a Velcro connection, a button connection, a buckle connection (e.g., a belt and buckle connection), and/or a strap connection (straps on one of the user shorts or user seal are received in hoops or loops in the other of the user shorts or user seal), etc. When the opening 148 receives a user wearing user shorts 300 sealed to the air chamber 130 by sealer 150, the air chamber 130 is substantially air tight and the user's waist is preferably aligned with the user seal 134.

The user seal frame 136 (bar, rod, tube, etc.) is coupled to the air chamber 130 and substantially surrounds the user seal 134. The user seal frame 136 includes a girdle 152 (i.e., a closed perimeter structure; in other embodiments, the perimeter structure need not be closed perimeter and may include one or more openings) coupled to a pair of front arms 154 and a pair of rear arms 156. In the embodiment shown, the girdle 152 has an irregular hexagonal shape, while other shapes are possible in various embodiments (circular, elliptic, triangular, rectangular, pentagonal, etc.). Front pegs 158 extend laterally outward and away from the front arms 154 and rear pegs 160 extend laterally outward and away from the rear arms 156. The user seal frame 136 is configured to provide structural support to the air chamber 130 by constraining an amount of inflation expansion of the air chamber. The user seal frame 136 is also configured to enable a vertical height adjustment of the user seal 134 relative to the running surface of running belt. More particularly, as described in detail below, the front pegs 158 and the rear pegs 160 engage the front racks 138 and the rear racks 140, respectively, to control the relative height of the user seal 134 in relation to the running belt 112 (i.e., a distance between the user seal 134 and the running belt 112). Thus, taller users may desire to have the user seal positioned vertically higher from the running surface of the running belt than shorter users. Placing the user seal frame 136 into various positions of the front and rear racks allows control of the height of the user seal to accommodate various user heights.

The front racks 138 are positioned proximate (at or near/close) the front end 116 of the device 100 and are coupled to the handrail assembly 104 before the user console 106 (i.e., the user console 106 is disposed closer to a front of the device 100, while the front racks 138 are disposed relatively closer to a rear end of the device 100 than the user console 106). As shown in FIGS. 1-4, the front racks 138 extend vertically upwards (i.e., away from the running belt 112) from the handrail assembly 104. In the embodiment of FIGS. 1-4, each front rack 138 includes a series of notches 162 (e.g., openings, etc.) positioned at various vertical heights away from the running surface of the running belt 112. While each front rack 138 is shown to include nine notches 162, it should be understood that any suitable spacing and number of notches 162 is possible. In one embodiment, the notches 162 are labelled (e.g., named, numbered) to identify each notch 162 in the series of notches 162. For example, the lowest notch 162 may be "1" with the remaining notches 162 labelled as integers up through "9" for the highest notch 162, or vice versa. As another example, each notch 162 may be labelled based on a distance of the notch 162 from some landmark, such as from the lowest notch 162 or from the running surface of the running belt 112. The notches 162 of the respective pair of front racks 138 are preferably aligned, such that each notch 162 on one of the front racks 138 corresponds to a notch 162 at the same height above the running belt 112 on the other front rack 138. Corresponding notches 162 may have the same label.

The notches 162 are configured to receive the front pegs 158 (e.g., protrusions, members, extensions, etc.). The user seal frame 136 is structured such that the front pegs 158 simultaneously fit in corresponding notches 162 (i.e., in notches 162 at the same height on both front racks 138). In some embodiments, the front racks 138 and the user seal frame 136 are configured to prevent the front pegs 158 from being simultaneously received by two notches 162 at different heights relative to a support or ground surface for the device 100 (e.g., a first notch 162 on one front rack 138 and a lower notch 162 on the other front rack 138).

Each front rack 138 also includes a retaining member or gate 164 (e.g., latches, levers, etc.) which are coupled, particularly rotatably coupled, to the corresponding front racks 138. The gates 164 are rotatable between an open position to allow the front pegs 158 to be freely inserted into or removed from the notches 162 and a closed position to confine the front pegs 158 in the notches 162. A locking mechanism may be included to releasably secure the gates 164 in the closed or open positions.

The rear racks 140 are positioned along the sides of the treadmill 102 between the front end 116 and the rear end 118. The rear racks 140 are coupled to the treadmill frame 103 on opposing transverse sides of the running belt 112, such that the rear racks 140 are disposed on the sides of the user while the user is using the device 100 (proximate each of the user's arms when the user is facing the console 106). The rear racks 140 are substantially parallel to the front racks 138 and each rear rack 140 includes a series of notches 168 positioned at various vertical heights relative to the treadmill 102. As shown, each rear rack 140 includes nine notches 168, while any suitable spacing and number of notches 168 is possible. The notches 168 are labelled (e.g., named, numbered) to identify each notch 168 of the series of notches 168. For example, the lowest notch 168 may be "9" with the remaining notches 168 labelled as integers down through "1" for the highest notch 168, or vice versa. As another example, each notch 168 may be labelled based on a distance of the notch 168 from some landmark, such as the lowest notch 168, the running belt 112, or a support or ground surface for the device 100. The notches 168 align across the pair of rear racks 140, such that each notch 168 on one of the rear racks 140 corresponds to a notch 168 on the other rear rack 140 at the same height above the treadmill 102. Corresponding notches 168 may have the same label.

The notches 168 are configured to receive the rear pegs 160 (e.g., protrusions, members, extensions, etc.). The user seal frame 136 is structured to allow the pair of rear pegs 160 to simultaneously be received by two corresponding notches 168 (i.e., one notch 168 on each rear rack 140). In some embodiments, the rear rack 140 and the user seal frame 136 are configured to prevent the rear pegs 160 from being simultaneously received by two notches 168 at different heights off the treadmill 102 (e.g., a first notch 168 on one rear rack 140 and a higher notch 168 on the other rear rack 140).

The rear rack 140 and the front rack 138 are positioned such that a pair of notches 168 of the rear rack 140 receive the pair of rear pegs 160 while the notches 162 of the front rack simultaneously receive the front pegs 158. When the pair of rear pegs 160 is received by a pair of notches 168 and the front pegs 158 are received by a pair of notches 162, the user seal frame 136 is fixed at a particular height (i.e., a vertical displacement) in relation to the treadmill 102. When the air chamber 130 is inflated as described below, the fixed height of the user seal frame 136 confines the expansion air chamber 130 near the user seal 134 to establish the approximate height of the user seal 134. Thus, the front pegs 158 and the rear pegs 160 are moveable to different notches 162 and notches 168 to adjust the height of the user seal 134 relative to the running surface, for example to set the user seal 134 at roughly the height of the user's waist. The rear rack 140, the front rack 138, and the user seal frame 136 are thereby configured to adjust the distance between the user seal 134 and the running belt 112 to accommodate the various heights of various users.

When describing the various relative heights with respect to the running belt 112, it should be understood that this is meant to mean the height from a point that is vertically substantially perpendicular from the running surface of the running belt 112 and the designated component (i.e., a straight vertical line distance between the designated component and the corresponding point on the running belt). However, other landmarks may also be used to define various relative heights, such as from a support or ground surface to the designated component. Further, other points on the running belt 112 may also be used in place of the vertically perpendicular point. For example, a longitudinal center of the running belt 112 may also be used as the reference point. All such variations are intended to fall within the scope of the present disclosure.

The pump 142 is configured to selectively pump, force, direct, or move air or other fluid into the air chamber 130. The pump 142 is operable to inflate the air chamber 130 and to control the air pressure in the air chamber 130 above atmospheric pressure. At a typical operating pressure above atmospheric pressure, the air chamber 130 has a substantially consistent volume, as the air chamber 130 is resistant to stretching. Thus, as more air is added to the air chamber 130 after full inflation, the air pressure in the air chamber 130 increases beyond atmospheric pressure. Some amount of air leakage out of the air chamber 130 may be likely in these conditions, which necessitates the periodic operation of the pump 142 to replace the leaked air and maintain a certain air pressure within the chamber 130.

More particularly, the pump 142 is configured to controllably vary the air pressure in the air chamber 130. In this regard, the pump 142 includes a motor operable at a variable power to push air at a higher or lower rate into the air chamber 130. Because some amount of air may leak out of the air chamber 130, the motor may operate at a roughly consistent power to maintain the air pressure at a particular pressure (i.e., to push in air at a rate equivalent to the leakage). To increase the air pressure, the power of the pump motor is increased to cause the pump 142 to provide air to the air chamber 130 at a higher rate, i.e., faster than air can leak out of the air chamber 130 as the amount of air in the air chamber 130 increases, the air pressure in the air chamber 130 similarly increases. To decrease the air pressure, the power of the pump motor is decreased or terminated such that air leakage out of the air chamber 130 exceeds the rate of air pumped into the air chamber 130 by the pump 142. In some embodiments, the pump 142 is configured to reverse directions to actively pump air out of the air chamber 130 to proactively decrease pressure. In some embodiments, a vent is opened through the air chamber 130 (e.g., vent hole) to facilitate a decrease in pressure.

In some embodiments, the pump 142 includes a pressure sensor disposed within the air chamber 130 that measures the air pressure inside the air chamber 130. In some embodiments, a strain gauge, pressure-sensing bladder, load cell, and/or other sensor configured to measure a pressure, strain, or force on the air chamber 130 is included. For example, a strain gauge may be positioned on the air chamber 130 and measure a degree of curvature of the air chamber 130 that may correlate to pressure. As another example, the pressure sensing bladder may be positioned within the air chamber and measure pressure based on deformation of the bladder.

As another example, a load cell may be positioned outside of the air chamber 130 and between the air chamber 130 and a solid surface (e.g., an element of the treadmill frame 103) such that the load cell can measure an outward force exerted by the air chamber 130. In other embodiments, the air pressure inside the air chamber 130 is determined based on the amount of power required by the pump 142 to push a certain volume of air into the air chamber 130 (i.e., as the pressure increases, adding a certain amount of air gets harder). Using the measurements from one or more such sensors, a feedback control system may be used to control the air pressure in the air chamber 130.

When a user is sealed into the user seal 134 and the pump 142 controls the air pressure in the air chamber 130 to exceed atmospheric pressure, the air pressure in the air chamber 130 pushes outward on the air chamber 130 to inflate the chamber. Part of the outward force on the air chamber 130 is transferred to the user via the physical contact between the user and user shorts 300, which are coupled to the air chamber 130, with the net force on the user direct up and away from the running belt 112. Additionally, the air pressure may exert a force directly on the user (the part of the user disposed in the air chamber 130) that pushes the user up and away from the running belt 112. A portion of the user's weight is thereby offloaded by the offloading system 108. At higher air pressures in the air chamber 130, more of the user's weight is offset by the offloading system 108 (i.e., increasing air pressure increases the amount of upward force exerted on the user). Thus, the portion of the user's weight offloaded by the offloading system 108 is controllable by varying the air pressure in the air chamber 130.

Figure 5:
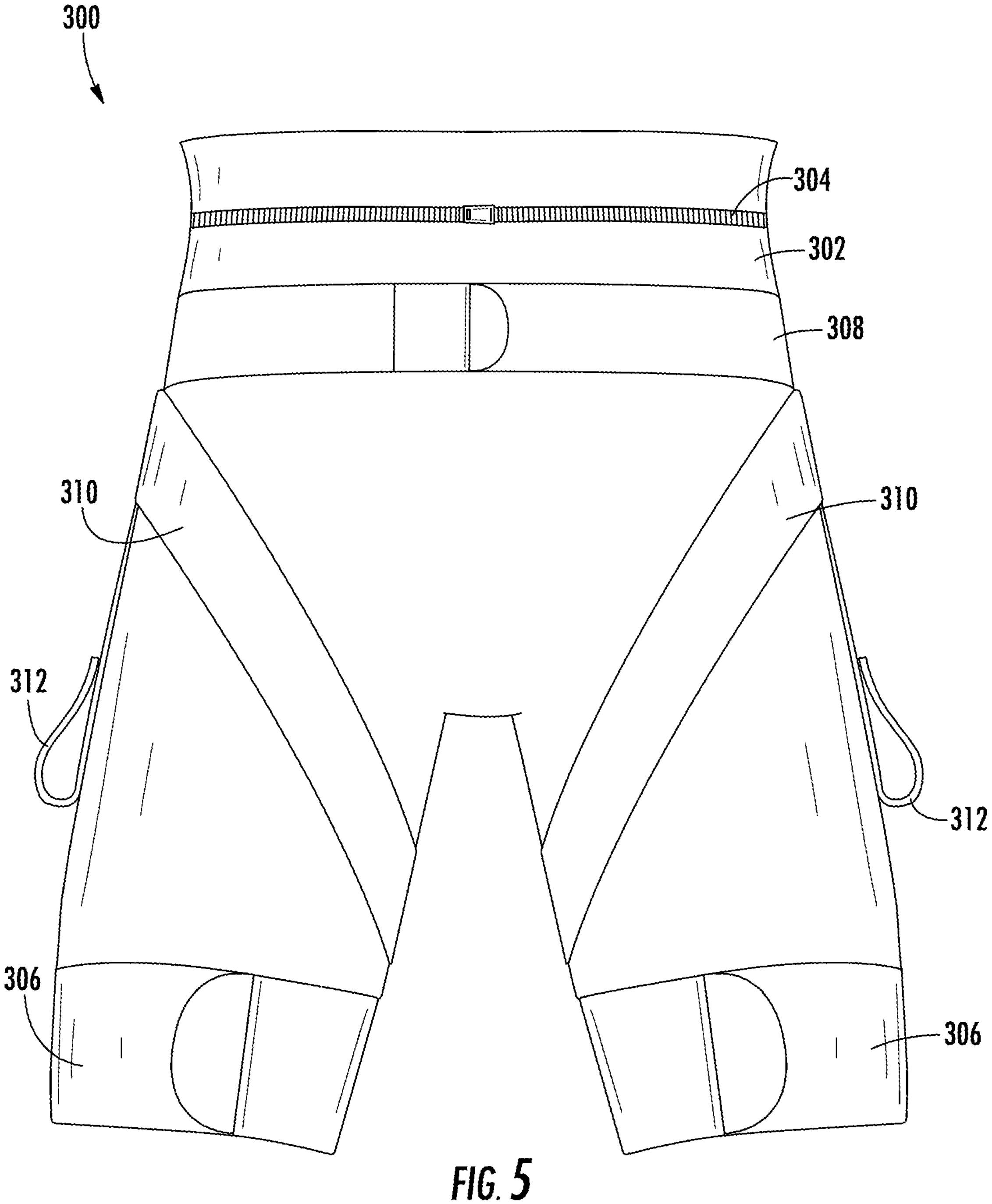
FIG. 5 is a depiction of user shorts for use with the exercise and therapeutic device of FIG. 1, according to an exemplary embodiment.

Referring now to FIG. 5, user shorts 300 for use with the exercise and therapeutic device 100 are shown, according to an exemplary embodiment. Shorts 300 are available in a variety of sizes, for example extra-small, small, medium, large, extra-large, and extra-extra-large. Shorts 300 are configured to create a substantially airtight seal between shorts 300 and the user's skin. Shorts 300, in cooperation with the user's body, thereby facilitate the creation of a substantially air-tight air chamber 130.

Shorts 300 include waistband 302 configured to engage with sealer 150 (e.g., zipper, Velcro, buckles, buttons, etc.) of the user seal 134 to seal the shorts 300 to the air chamber 130 to substantially close the opening 148. In the example shown, the waistband 302 includes a zipper 304 that facilitates connection of the shorts 300 to the sealer 150 in a proper position. Other connection mechanisms [e.g., buckles, buttons, Velcro (i.e., hook-and-loop fastener)] may be included in various embodiments. The shorts 300 are also shown to includes various straps configured to facilitate creation of a substantially airtight seal around the user and/or provide various other support to the user. Thigh straps 306 are positioned at a lower end of each leg of the shorts 300 and can be tightened around a user's thighs to reduce a rate of air leakage between the shorts 300 and the user. Waist strap 308 is positioned at waist region of the shorts 300 adjacent the waistband 302 and can be tightened to secure the shorts 300 to a user to resist displacement of the user relative to the shorts 300 during an exercise or therapy. Diagonal straps 310 extend from a hip region of the shorts 300 to an inner thigh region of the shorts 300 and may provide structural support. Outside straps 312 extend along opposing sides of shorts 300. The diagonal straps 310 and the outside straps 312 can distribute forces across the shorts 300 to facilitate comfortable offset of a user's weight by the offloading system 108. The various straps 306-312 can be adjusted to facilitate customization of the shorts 300 to match the physical dimensions of each of a variety of users.

Figure 6:
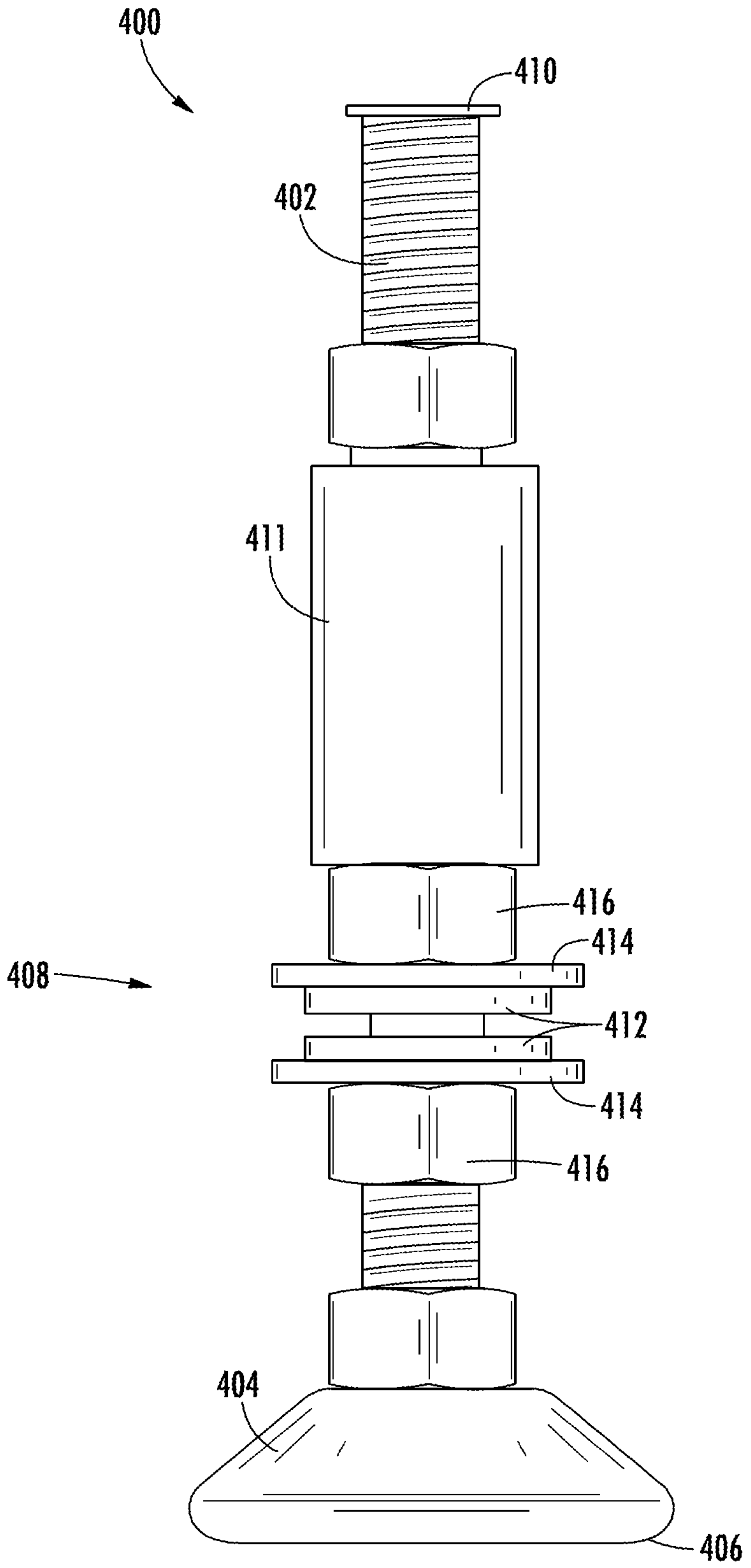
FIG. 6 is a side view of a leg for the exercise and therapeutic device of FIG. 1, according to an exemplary embodiment.

Referring now to FIG. 6, a leg 400 for the exercise and therapeutic device 100 is shown, according to an exemplary embodiment. In the example depicted, the device 100 includes a plurality of legs 400 (in this example, four) that are coupled to the treadmill frame 103 and structured to support the treadmill frame 103 and, in turn, device 100 above a support surface for the device 100. The legs are adjustable in height relative to the support surface in order to increase or decrease an incline of the device 100. As shown, the leg 400 includes a threaded shaft 402, a foot 404 extending from a bottom end 406 of the leg 400, and a gasket assembly 408 positioned along the threaded shaft 402. The threaded shaft 402 extends through an aperture or hole in the air chamber 130, such that the foot 404 is positioned outside the air chamber 130 while the top end 410 of the threaded shaft 402 is positioned within the air chamber 130.

The foot 404 may be rotated in order to adjust a distance from the foot 404 relative to the treadmill frame 103 to, in turn, adjust a height (incline, decline, parallel or substantially parallel) of the frame 103 relative to the support surface. As mentioned above, the exercise and therapeutic device 100 includes multiple legs 400, such that threaded shafts 402 facilitate the adjustment of the offsets to help level the treadmill 102 and prevent the exercise and therapeutic device 100 from wobbling, feeling unsteady, etc. In some embodiments, the leg 400 includes a spacer 411 that provides structural support to the threaded shaft 402.

The gasket assembly 408 substantially seals the hole in the air chamber 130 that the threaded shaft 402 extends through to reduce the likelihood of air escaping or leaking from the air chamber 130 through the hole. The gasket assembly 408 includes a pair of gasket washers 412, a pair of washers 414, and a pair of hex nuts 416. The gasket washers 412 are positioned on either side of the air chamber 130 (i.e., external or outside of the air chamber and internal or inside of the air chamber such that the washers 412 sandwich a portion of the air chamber adjacent the hole), the washers 414 are positioned on either side of the pair of gasket washers 412, and the hex nuts 416 are positioned on either side of the pair of washers 414. Each washer 414 abuts a gasket washer 412 and a hex nut 416. The gasket washers 412 have an external radius greater than the radius of the hole through the air chamber 130 that receives the threaded shaft 402. To seal the hole through the air chamber 130 that receives the threaded shaft 402, the hex nuts 416 are tightened towards each other, squeezing the pair of washers 414 together, which in turn squeezes the pair of gasket washers 412 together against the air chamber 130. The gasket washers 412 are thereby sealed against the air chamber 130, preventing or substantially preventing airflow out of the air chamber 130 through the gasket assembly 408.

Applicant has determined that during inflation and while the air chamber 130 is inflated, there exists the possibility that the air chamber 130 lifts or otherwise reduces stability of the device 100. In these situations, the air chamber is inflated to such a degree that the bottom of the chamber bears against the surface supporting the treadmill (e.g., the floor of a room) and begins to offload the treadmill itself. By piercing the legs through the air chamber 130 in a manner that still ensures the integrity of the air chamber 130 (i.e., preventing or substantially preventing leaks), the effect of the air chamber 130 causing the device 100 to "walk" or be unstable is substantially reduced/alleviated. As a result, the leg 400 structure described herein improves the usability of the device 100.

The controller 110 is configured to control, manage, and otherwise operate various components of the exercise and therapeutic device 100 including the pump 142, the treadmill motor 114, and the user console 106. In the case primarily described herein with the treadmill being a motorized treadmill (as compared to a manually-powered treadmill), the controller 110 controls the pump 142 and the treadmill motor 114 in response to input from the user via the user console 106 and data provided by the pump 142 and/or the treadmill motor 114. The configuration and functionality of the controller 110 is described in detail below with reference to FIG. 7.

Figure 7:
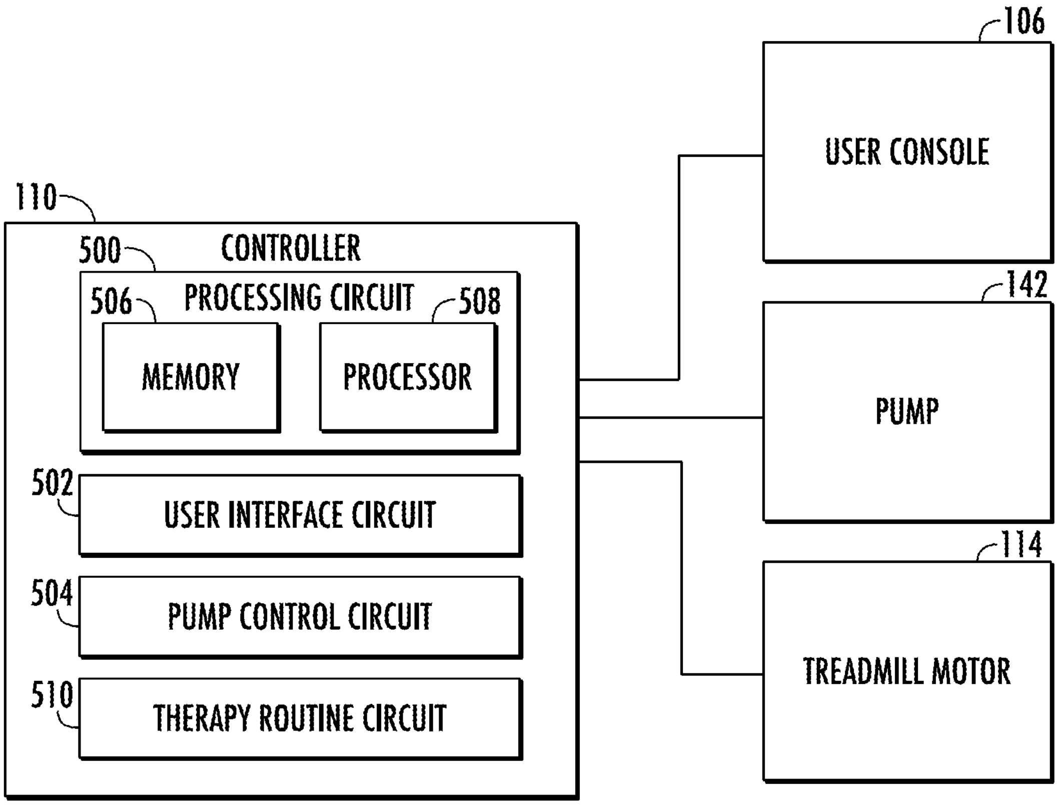
FIG. 7 is a block diagram of a controller of the exercise and therapeutic device of FIG. 1, according to an exemplary embodiment.

Referring now to FIG. 7, a block diagram of the controller 110 is shown, according to an exemplary embodiment. More particularly, FIG. 7 shows the controller 110 is coupled to the user console 106, the pump 142, and the treadmill motor 114. It should be understood that the controller 110 may also be coupled to one or more sensors disposed or included with the device 100 (e.g., heart rate sensors, running belt speed sensors, pressure sensor for the air chamber, etc.).

The user console 106 provides information to a user of the exercise and therapeutic device 100 and receives information from the user and the controller 110. The user console 106 includes both output elements (e.g., screens, speakers, displays) and input elements (e.g., touchscreen, buttons, knobs, keyboards). One or more permanent markings on the user console 106 may be included to help to communicate the meaning of digital output elements to the user (e.g., permanent field labels like "speed", "level", "time", "distance" positioned next to digital displays of numbers). The user console 106 is communicably coupled to the controller 110 to receive data from the controller 110, for example a graphical user interface generated by the controller 110, and to send data to the controller 110 as input by a user, for example a user's short size, a user's waist size, a frame height setting, a pressure scale level selection, and a treadmill speed.

As discussed above, the pump 142 operates at various pump operating capacities (e.g., pump motor powers, pump airflow rates) to selectively pump air from the external environment into the air chamber 130. The pump 142 is configured to vary the pump operating capacity as instructed by the controller 110 (e.g., via an operating parameter of the motor that drives the pump, such as power, voltage, pump frequency, etc.). In one embodiment, the pump is also configured to provide a pressure measurement or estimate or determination to the controller 110, for example as measured by a pressure sensor disposed within the air chamber 130 or strain gauge positioned on the air chamber 130. The pressure measurement may also be generated in some other way, for example by comparing the operating power of the pump with a rate of airflow provided to the air chamber 130. Accordingly, the pump 142 is communicably coupled to the controller 110 to receive a pump operating capacity command from the controller 110 and provide a pressure measurement to the controller 110.

The treadmill motor 114 is controllable by the controller 110 to drive the running belt 112 at various speeds. The treadmill motor 114 may be an electrical motor that engages the running belt 112 (e.g., via a shaft) to cause the running belt 112 to move a proportional distance for each revolution of the treadmill motor 114. The controller 110 compares this proportional distance and the electrical motor revolutions to store a calibration of how the rate of revolutions of the treadmill motor 114 corresponds to the speed of the running belt 112, which information may be provided to the user via the user console 106. In such embodiments, the controller 110 controls the rate of revolution of the treadmill motor 114 to provide these various desired simulated running/walking speeds to the user, for example in response to a user request to run at a certain speed input via the user console 106.

The controller 110 is structured to control the pump 142 and the treadmill motor 114 to facilitate the functions of the exercise and therapeutic device 100 described herein. In the example shown, the controller 110 includes processing circuit 500, user interface circuit 502, pump control circuit 504, and therapy routine circuit 510.

The processing circuit 500 is structured to execute the computing and processing steps of the controller 110. The processing circuit 500 includes memory 506 and processor 508. The processor 508 may be implemented as one or more general-purpose processors, an application specific integrated circuit (ASIC), one or more field programmable gate arrays (FPGAs), a digital signal processor (DSP), a group of processing components, or other suitable electronic processing components. Processor 508 is configured to execute computer code or instructions stored in memory 506 or received from other computer readable media (e.g. CDROM, network storage, a remote server, etc.). Memory 506 (e.g., NVRAM, RAM, ROM, Flash Memory, hard disk storage, etc.) may store data and/or computer code for facilitating at least some of the various processes described herein. Memory 506 may include one or more devices (e.g. memory units, memory devices, storage device, etc.) for storing data and/or computer code and/or facilitating at least some of the various processes described in the present disclosure. In this regard, the memory 506 may include tangible, non-transient computer-readable medium. Memory 506 may be communicably connected to processor 508 via processing circuit 500 and may include computer code for executing (e.g., by processor 508) one or more processes described herein. When processor 508 executes instructions stored in memory 506, processor 508 generally configures controller 110 to complete such activities.

The user interface circuit 502 is structured to generate user interface elements for display by the user console 106, and receives input from a user or other person via the user console 106. In some embodiments, the user interface circuit 502 generates a graphical user interface that is displayed via user console 106. In some embodiments, the user interface circuit 502 generates a digital display signal that controls digital display elements (e.g., LED lights) that can be turned either on or off selectively to create characters (e.g., symbols, images, etc.) on the user console 106. In general, the user interface circuit 502 generates an output in any format compatible with the hardware included with user console 106. As described in detail with reference to FIG. 8, the user interface provided on the user console 106 as controlled by the user interface circuit 502 can prompt and accept user input of a user's short size, a user's waist size, a frame height setting, and a pressure scale level, and a treadmill speed.

The pump control circuit 504 is structured to control the pump 142 in response to inputs from the pump 142 and the user console 106. The pump control circuit 504 generates a pump operating capacity control signal to transmit to the pump 142 to cause the pump to operate at an operating capacity (e.g., power, frequency, etc.) determined by the pump control circuit 504 in response to inputs from the pump 142 and the user console 106. As described in detail with reference to FIG. 8, the pump control circuit 504 uses any number of a variety of inputs including a user's short size, a user's waist size, and a frame height setting to associate user-selectable scale levels with air pressures for the air chamber 130 and generates a control signal for the pump 142 to control the pump 142 to bring the air chamber 130 to the air pressure associated with a user-selected scale level. In some embodiments, the pump control circuit 504 and/or memory 506 stores pressure-to-scale-level associations for various possible combinations of short size, waist size, and frame height setting to facilitate a look-up process. Accordingly, a pressure setpoint can be determined based on the user-selected scale level. In other cases, a default pressure value is used as the pressure setpoint (e.g., to enable a quick-start mode of the device 100). The pump control circuit 504 receives a pressure measurement from the pump 142 and/or a sensor (e.g., pressure sensor, strain gauge, etc.) and uses the pressure measurement in a control loop (e.g., feedback controller, proportional-integral, proportional-integral-derivative control) to control the pump 142 to maintain the air pressure within a band (e.g., acceptable range) around a pressure setpoint. The pump 142 is thereby controlled to provide and maintain a pressure in the air chamber 130 in accordance with a user-selected scale level.

In some embodiments, the pump control circuit 504 is configured to provide dynamic pressure adjustment that adjusts control of the pump 142 to account for changes in pressure attributable to user activity. For example, depending on whether a user is running, walking, jogging, skipping, etc. on the running surface, the user exerts various forces on the air chamber 130 (e.g., via user shorts 300) that may cause dynamic changes in the pressure in the air chamber 130. For example, a running user may oscillate vertically relative to the device 100, thereby causing repeating fluctuations of pressure in the air chamber 130, while a user walking on the running surface may exert less forces and have less effect on the pressure in the air chamber 130. The pump control circuit 504 may be configured to account for such differences, for example by receiving measurements of pressure fluctuations over time (e.g., from a pressure sensor disposed in the air chamber 130, from a strain gauge positioned on the air chamber 130, etc.) and using the pressure fluctuations to update the pressure setpoint (i.e., increase or decrease the pressure setpoint) to account for the user's influence on measured pressure. As another example, the pump control circuit 504 may be configured to filter out user-attributable pressure fluctuations (e.g., remove a repeating wave having a frequency corresponding to a running cadence of a user) from pressure measurements before such measurements are used for feedback control of the pump, thereby reducing noise in the measurement signal used for feedback control of the pump 142.

The therapy routine circuit 510 is configured to facilitate coordination between the pump 142 and the treadmill motor 114 to provide therapy routines and/or other interactive behavior between the pump 142 and the treadmill motor 114. As used herein, a "therapy routine" refers to a series of pressure setpoints and treadmill motor controls that guides a user through a therapy (e.g., rehabilitation program) or workout (e.g., exercise). The therapy routine circuit 510 is configured to provide a scale level or pressure setpoint to the pump control circuit 504 to cause the pump control circuit 504 to operate the pump 142 in accordance with the scale level or pressure setpoint. The therapy routine circuit 510 is also configured to control the treadmill motor 114 to vary the speed of the running belt 112, start and stop the running belt 112, change the direction of movement of the running belt 112, provide resistance to user-driven motion of the running belt 112, etc. The therapy routine circuit 510 is thereby configured to control both the amount user weight offloaded by the offloading system 108 and the movement of the running belt 112 (e.g., the speed at which a user is running, jogging, walking, etc. on the treadmill 102). This can include the resistive mode of operation of the treadmill as described above.

In some cases, the therapy routine circuit 510 may control the pressure level or setpoint to vary as a function of speed of the running belt 112 (e.g., a monotonically-increasing function), for example such that a larger portion of a user's weight is offloaded by the offloading system 108 at higher speeds of the running belt. In some embodiments, the therapy routine circuit 510 is communicable with a heart rate monitor, muscle oxygenation sensor, cadence sensor, fitness tracker, or other sensor or measurement of user activity or biological behavior. In such embodiments, the therapy routine circuit 510 may be configured to determine a pressure level and/or speed based on measurements of user activity (e.g., heart rate, muscle oxygenation, cadence, ground contact time, etc.), for example to maintain a user at approximately a preferred heart rate level or zone or to drive the user's heart rate to various zones in sequential intervals.

The therapy routine circuit 510 may store and execute various therapy routine programs that include control of both the pump 142 and the treadmill motor 114, to dynamically vary the user weight offloaded by the offloading system 108 and the movement of the running belt 112 over a predesigned workout or therapy routine. For example, the therapy routine circuit 510 may be configured to provide intervals of various speeds of the running belt 112 in addition to intervals of various pressure settings (i.e., various weight offloads) for the offloading system 108 and/or gradually increase or decrease the speed and/or pressure. The therapy routine circuit 510 may be configured to receive customized therapy routine programs for particular users, for example from physical therapists, doctors, coaches, etc. for the users. The therapy routine circuit 510 may thereby facilitate unsupervised therapy using the device 100.

As shown, the user interface circuit 502, the pump control circuit 504, and the therapy routine circuit 510 are a part of the controller 110. In other embodiments, the user interface circuit 502, therapy routine circuit 510, and/or the pump control circuit 504 may be separate, discrete components relative to each other and the controller 110. In this regard and in this configuration, at least one of the user interface circuit 502, therapy routine circuit 510, and the pump control circuit 504 may be positioned in different locations within or adjacent to the exercise and therapeutic device 100.

It should be understood that the structures of the user interface circuit 502 and the pump control circuit 504 are highly configurable. In one configuration, one or both of user interface circuit 502 and the pump control circuit 504 are discrete processing components [e.g., each includes one or more of various processing components (e.g., processing and memory components, whereby the processor and memory may have the same or similar configuration as described above with respect to the memory 506 and processor 508)], and may be structured as described above, such as one or more e.g., a microcontroller(s), integrated circuit(s), system(s) on a chip, etc. In another embodiment, one or more both of the user interface circuit 502 and the pump control circuit 504 may be structured as machine-readable media (e.g., non-transient computer readable medium that stores instructions that are executable by a processor or processors to perform at least some of the processes herein) that may be stored in the memory 506 and executable by the processor. This latter configuration may be appealing because of the "all-in-one" characteristic. In the example shown, each of the pump control circuit 504 and the user interface circuit 502 is structured as machine-readable media. However, and in the spirit of the disclosure herein, this exemplary configuration is not meant to be limiting (i.e., one or both of these components may be separate and discrete processing components).

Figure 8:
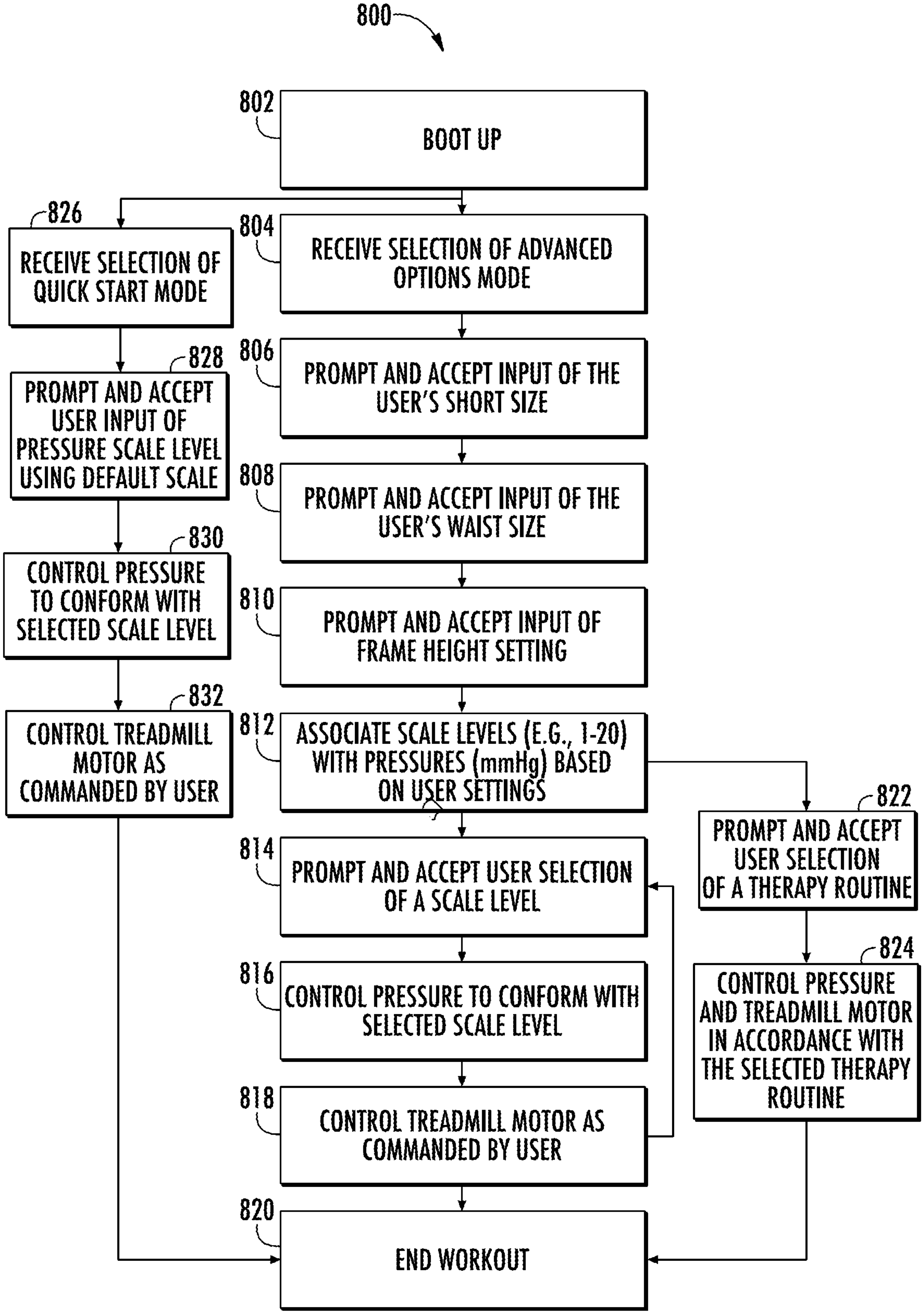
FIG. 8 is a flowchart of a process of operating the exercise and therapeutic device of FIG. 1, according to an exemplary embodiment.

Referring now to FIG. 8, a flowchart of a process 800 of operating the exercise and therapeutic device 100 is shown, according to an exemplary embodiment. The process 800 may be at least partly implemented by the controller. At step 802, the device 100 boots up (e.g., turns on, enters an active mode, awakens from standby), for example in response to a user request made via user console 106 (e.g., the push of a button, flip of a switch). At the time of boot up, user shorts 300, worn by a user, are secured into the user seal 134, the front pegs 158 of the user seal frame 136 are received by the desired pair of notches 162, the rear pegs 160 are received by the desired pair of notches 168, and the air chamber 130 is deflated. That is, the exercise and therapeutic device 100 is in the state shown in FIG. 4, with the addition of a user sealed into the user seal 134. Additionally, in the example of FIG. 7, at step 802 the user console 106 provides the user with an option to enter a quick start mode or an advanced options mode.

At step 804, the advanced options mode is selected. Upon selection, advanced options are provided to the user on the user console 106. The user interface circuit 502 of the controller 110 generates user interface elements and transmits those user interface elements to the user console 106 to communicate the advanced options to the user by displaying the advanced options on the user console 106. The advanced options and the advanced options mode are described below with reference to steps 806-824. The following steps 806-824 describe one possible mode of advanced options provided by the exercise and therapeutic device 100.

At step 806, the user console 106 prompts the user to enter the user's short size and accepts input of the user's short size from the user. The user's short size is the size of the user shorts 300 configured to seal the user into the user seal 134 (e.g., XS, S, M, L, XL, XXL). In an embodiment where the user console 106 includes a touchscreen, for example, at step 806 the user interface circuit 502 generates a graphical user interface that includes user-selectable short size options and transmits the graphical user interface to the user console 106. The user console 106 receives a user selection of a short size option and transmits the user's short size selection to the controller 110.

At step 808, the user console 106 prompts the user to enter the user's waist size and accepts input of the user's waist size from the user. The user's waist size is the circumference of the user's waist (i.e., a distance measured around the user at the user's waist). In some embodiments, the user's waist size correlates to a user's short size, with greater precision. For example, users with a short size of large ("L") may have waist sizes ranging between 32 inches and 36 inches, while the waist size may be entered into the user console 106 with specificity to the inch or fraction of an inch (e.g., 34.5 inches) or other unit of distance (e.g., centimeters). In an embodiment where the user console 106 includes a touchscreen, for example, at step 806 the user interface circuit 502 generates a graphical user interface that includes user-selectable waist size options (e.g., a number pad to enter a waist size, a scrollable list of waist sizes) and transmits the graphical user interface to the user console 106. In some embodiments, the user console 106 includes arrow buttons that allow the user to scroll through a list of selectable waist sizes presented on a digital display, and a select button to select a waist size from the list. The user console 106 receives a user selection of the user's waist size and transmits the user's waist size to the controller 110.

At step 810, the user console 106 (via the interface circuit) prompts the user to enter the frame height setting and accepts input of the frame height setting from the user. The frame height setting is the determined by the notches 162 that receives the front pegs 158 and/or the notches 168 that receives the rear pegs 160, and more particularly by the labels associated with the notches 162 and/or the notches 168. For example, in some cases, if the front pegs 158 are in notches 162 labelled "7", the frame height setting is "7." As another example, in some cases, if the rear pegs 160 are in notches 168 labelled "2", the frame height setting is "2." The user may be instructed (e.g., by a user interface on the user console 106) about whether to enter a rear frame height or a front frame height. In some embodiments, the front racks 138, the rear racks 140, and the user seal frame 136 are configured such that the rear pegs 160 and the front pegs 158 are restricted to fit into notches 168 and notches 162 with the same label, in which case that label is the frame height setting.

In an embodiment where the user console 106 includes a touchscreen, at step 806 the user interface circuit 502 generates a graphical user interface that includes user-selectable frame height setting options (e.g., a button corresponding to each possible frame height setting) and transmits the graphical user interface to the user console 106. The user console 106 receives a user selection of the frame height setting and transmits the frame height setting to the controller 110. In some embodiments, the front racks 138, the rear racks 140, and the user seal frame 136 include sensing elements configured to automatically detect the frame height setting and transmit the frame height setting to the controller 110.

At step 812, the pump control circuit 504 associates scale levels, for example denoted by an integer scale (e.g., 1-20), with air pressure setpoints (i.e., particular pressure values in mmHg, atm, Pascal, or other units of pressure) based on the various inputs such as the user's short size, the user's waist size, and/or the user's height setting. Notably, the user's weight is not used to control the amount of pressure in the air chamber and, in turn, the amount of weight offloaded from the user. This is advantageous in that less steps are used to begin operation of the device. Further, complicated control routines that may be prone to errors are avoided. In operation, the pump control circuit 504 assigns a different pressure (e.g., 2 atm, 3 atm) to each scale level (e.g., 5, 10) depending on the inputs of the short size, the user's waist size, and/or the user's height setting. Accordingly, the mapping of pressure setpoints to scale levels may be different for different short sizes, waist sizes, height settings, and combinations thereof. In other words, different pressure-to-scale maps are used/implemented based on the designations of one or more of: shorts size, waist size, height setting on the front and/or rear racks, and waist size. So, in operation, a scale input of 2 for a first pressure-to-scale map may result in a pressure value of X in the air chamber and a scale input of 2 for a second pressure-to-scale map may result in an pressure value of X+Y in the air chamber (where X and Y are non-zero). Thus, size differences in different users are accounted for in the pressure scale based on the inputs of one or more of the aforementioned inputs into the controller. The scale levels are selectable by a user to vary the air pressure in the air chamber 130, and thus change amount of the user's weight that is offloaded by the offloading system 108. Scale level association may allow the exercise and therapeutic device 100 to avoid offering air pressures a user that are too low (e.g., do not offload a noticeable amount of the user's weight by the offloading system) or too high (e.g., more than enough for all of the user's weight to be offloaded by the offloading system 108) for a particular user, and can center the scale on or provide more precise control around a predicted preferred pressure setpoint.

In some embodiments, the pump control circuit 504 generates the pressures for each scale level based on a pressure calculation algorithm (e.g., a mathematical relationship between the pressure scale levels and one or more of short size, waist size, or frame height setting). In other embodiments, the pump control circuit 504 stores pressure-to-scale-level mappings for all possible combinations of short size, waist size, and/or frame height setting. That is, based on the input of short size, waist size, and/or frame height setting for a current user, the pump control circuit 504 can identify the pressure-to-scale-level mapping associated with the one or more of short size, waist size, and frame height setting for the current user. The pump control circuit 504 can thereby select a suitable set of pressure setpoints at step 812.

At step 814, in one scenario, the user console 106, via one or more commands from the interface circuit, prompts and accepts a user selection of a scale level. The scale level may be selectable on the user console 106 by using arrow buttons to scroll up and down through the scale levels. When the user selects a scale level, the selection is transmitted to the controller 110.

At step 816, the pump control circuit 504 controls the pump 142 to establish and maintain the air pressure in the air chamber 130 at the pressure associated with the user or attendant-selected scale level. For example, the controller 110 may generate a pump operating capacity command and transmit the command to the pump 142 to cause the pump 142 to operate a particular capacity. When a pressure sensor of the pump 142 detects that the pressure has reached the pressure associated with the user-selected scale level, the controller 110 adjusts the pump operating capacity command to instruct the pump 142 to lower the pump operating capacity (i.e., to pump less air into the air chamber 130). A control loop may be established to maintain the air pressure measured for the air chamber 130 within a threshold range of the pressure associated with the user-selected scale level.

At step 818, the treadmill motor 114 is operated as commanded by a user or an attendant. For example, the user may indicate via the user console 106 that the user wants to walk at three miles per hour. That indication is transmitted to the controller 110, which in turn controls the treadmill motor 114 to cause the running belt 112 to rotate at three miles per hour, for example based on a calibration stored by the controller 110. The treadmill 102 is thereby controllable through a range of walking/running speeds. The treadmill 102 may also be controllable at step 818 to provide a resistance or torque in accordance with a command received from the user via the user console 106.

In some cases, the process 800 returns to step 814 when the user selects a new scale level. At step 818, the pressure in the air chamber 130 is modified to match the pressure corresponding to the newly-selected scale level by generating pump control signals at the controller 110 as discussed above. The treadmill motor 114 may automatically stop while the pressure is altered, or may continue to run the running belt 112 at a user-selected speed while the pressure is adjusted to match the newly selected scale level.

In another scenario, following step 812, the user console 106, via one or more commands from the user interface circuit 502 and information from the therapy routine circuit 510, prompts and accepts a user selection of a therapy routine at step 822. For example, a list of therapy routines stored by the therapy routine circuit 510 may be displayed on the user console 106. The user may select a therapy routine from the list.

At step 824, the therapy or exercise routine selected by the user provided by automatically controlling the pressure in the air chamber 130 and the behavior of the treadmill motor 114 in accordance with the selected therapy routine. The therapy routine circuit 510 can change the scale level over time and cause the pressure in the air chamber 130 to be controlled in accordance with such changes in the scale level. Because the advanced settings have been received in steps 806-812, the scale levels applied by the therapy routine circuit 510 to execute the selected therapy routine may correspond to the height, waist size, and/or short size of the particular user. The therapy routine circuit 510 also controls the behavior of the treadmill motor 114 to provide various speeds of the running belt 112 and/or other behaviors over the duration of the selected therapy routine.

Returning to step 802, in some scenarios a quick start mode is selected at step 826. If the quick start mode is selected, a default set of pressure scale levels is used. The default set of pressure scale levels associates scale levels (e.g., levels 1-20) with pressure setpoints (pressure values), such that each scale level corresponds to a particular pressure setpoint. In some embodiments, the default scale levels are suitable for an average or median user (e.g., corresponding to the most common selections of short size, weight size, and/or frame height as described for steps 808-810). In some embodiments, the default scale levels are configured to provide a large range of pressure setpoints such that a suitable pressure level may be found for any user.

At step 828, the user console 106, via one or more commands from the user interface circuit 502, prompts and accepts a user selection of a scale level. The scale level may be selectable on the user console 106 by using arrow buttons to scroll up and down through the scale levels. When the user selects a scale level, the selection is transmitted to the controller 110.

At step 830, the pump control circuit 504 controls the pump 142 to establish and maintain the air pressure in the air chamber 130 at the pressure associated with the user-selected scale level, for example as described above for step 816. At step 832, the treadmill motor 114 is controlled as commanded by a user. For example, the user may input a speed to the user console 106, and, in response, the controller 110 controls the treadmill motor 114 to drive the running belt 112 at the user-selected speed. Steps 828 and 830 may be repeated indefinitely in accordance with user inputs to the user console 106.

Following step 818, 832, or 824, at step 820, the workout ends. A button or other user-selectable feature is included on the user console 106 to allow the user to indicate that the user wants to end the workout. In response, the controller 110 slows the treadmill motor 114 to a stop and commands the pump 142 to allow the air chamber 130 to deflate. In some embodiments, the pump 142 is controlled to proactively pump air out of the air chamber 130 to deflate the air chamber 130. The exercise and therapeutic device 100 then turns off or enters a power saver or standby mode.

Step 820 may also include emergency stops that end the workout. For example, the workout may automatically be ended if pressure is lost in the air chamber 130 (e.g., due to a puncture, tear, unsealing, etc. of the air chamber 130). In such a case, the controller 110 may determine that the air pressure in the air chamber 130 as measured or otherwise determined by the air pressure sensor of the pump 142 is not responding as expected to the pump control signal, and, in response, control the treadmill motor 114 to stop the running belt 112 and turn off the pump 142 (e.g., to facilitate deflation of the air chamber 130). In some embodiments, the console 106 includes an emergency stop button which can be selected to initiate concurrent deflation of the air chamber 130 and stopping of the movement of the running belt 112. Other events may also trigger an emergency stop, for example an electrical or mechanical failure in the pump 142 or the treadmill 102 or a detectable unsafe action of a user.

Referring now to FIGS. 9-12, a series of charts or diagrams 900-906 that provide guidance to a user (or other person, such as a physician) for selecting a scale level of pressure in the air chamber 130 are shown, according to exemplary embodiments. In various embodiments, one or more of the charts 900-906 are presented to a user and/or a supervisor (e.g., therapist, doctor, nurse, personal trainer, coach) in one or more of a variety of formats. In one embodiment, the one or more charts 900-906 may be presented as a graphical user interface on a screen of the user console 106. In another embodiment, at least one of the one or more charts 900-906 may be accessible in an app-based or browser-accessible graphical user interface using a smartphone, tablet, personal computer, etc. In still another embodiment, at least one of the one or more charts may be printed in a physical form, for example on a sticker affixed to the exercise and therapeutic device 100 or in a booklet, pamphlet, handout, etc.

In the embodiments shown in FIGS. 9-12, the charts are displayed on a graphical user interface of the user console 106, as generated by the user interface circuit 502. FIG. 9 shows user console 106 displaying chart 900, according to an exemplary embodiment. Chart 900 shows an array of scale levels and their correspondence to two variables, namely a user weight and an assistance percentage, for a pressure scale corresponding to default settings (e.g., without the advanced settings of process 800). The user weight is how much the user weighs, shown in pounds in this example. The assistance percentage is the approximate percentage of a user's weight that is offloaded by the offloading system 108. Thus, chart 900 indicates a scale level that will allow a user of a particular weight to offset a particular percentage of the user's weight. For example, if the user weighs two hundred pounds and wants to offload half of his or her weight, the chart indicates that the user should select a scale level of eight. In an embodiment where the chart 900 is presented on a touchscreen of the user console 106, the user can touch an "8" on the chart 700 to instruct the controller 110 to control the pump 142 to change the air pressure in the air chamber 130 to the pressure associated with scale level eight.

FIG. 10 shows user console 106 displaying chart 902, according to an exemplary embodiment. Chart 900 shows an array of scale levels and their correspondence with user weight and assistance percentage, for a pressure scale associated with a user height of 5'6", a waist size of 32", and a frame height setting of 4, as indicated in header 910. In some embodiments, chart 902 also indicates that it corresponds to a particular user short size (e.g., medium). Thus, chart 902 may be tuned to a specific user in response to the user inputs of steps 806-810. As for chart 900, chart 902 indicates the scale level that will allow a user of a particular weight to offset a particular percentage of his or her weight.

FIG. 11 shows user console 106 displaying chart 904, according to an exemplary embodiment. Chart 904 shows an array of scale values and their correspondence to two variables, namely frame height setting and assistance percentage. As indicated in box 912, the values on chart 904 are tuned to be accurate for a user that weighs one hundred and seventy-five pounds. For example, the chart communicates that a user who weighs one hundred and seventy-five pounds and has a frame height setting of 8 can offload seventy percent of his or her weight by selecting a scale level of 12. Such correlations can be pre-determined by laboratory testing or calculations, such that weight is not used in online control of the device 100.

FIG. 12 shows user console 106 displaying chart 906, according to an exemplary embodiment. Chart 906 indicates maximum recommended assistance scale levels for users based on the user height and user weight. The maximum recommended assistance scale level may correspond to a scale level that offsets all or a predefined percentage of a user's weight (e.g., 100% assistance percentage). For the largest users (e.g., tallest and heaviest), the maximum recommended assistance level may correspond to the maximum amount of assistance that the offloading system 108 can provide due to limitations on pump power, membrane (air chamber 130) strength, etc.

Charts 900-906 thereby help a user or attendant (e.g., therapist, doctor, coach) to control the exercise and therapeutic device 100 to carry out a training or rehabilitation program designed around assistance percentages or weight offsets without the need for the user's weight to be input into or measured by the exercise and therapeutic device 100. Control of the exercise and therapeutic device 100 is achieved without use of user weight as an input, measurement, or calculated value. The device 100 reduces the stresses and forces created by the impact of the user on the treadmill 102 with each stride in a controllable manner tailored to particular users. Exercise and therapeutic device 100 is therefore well suited for rehabilitation and injury prevention.

Figure 28:
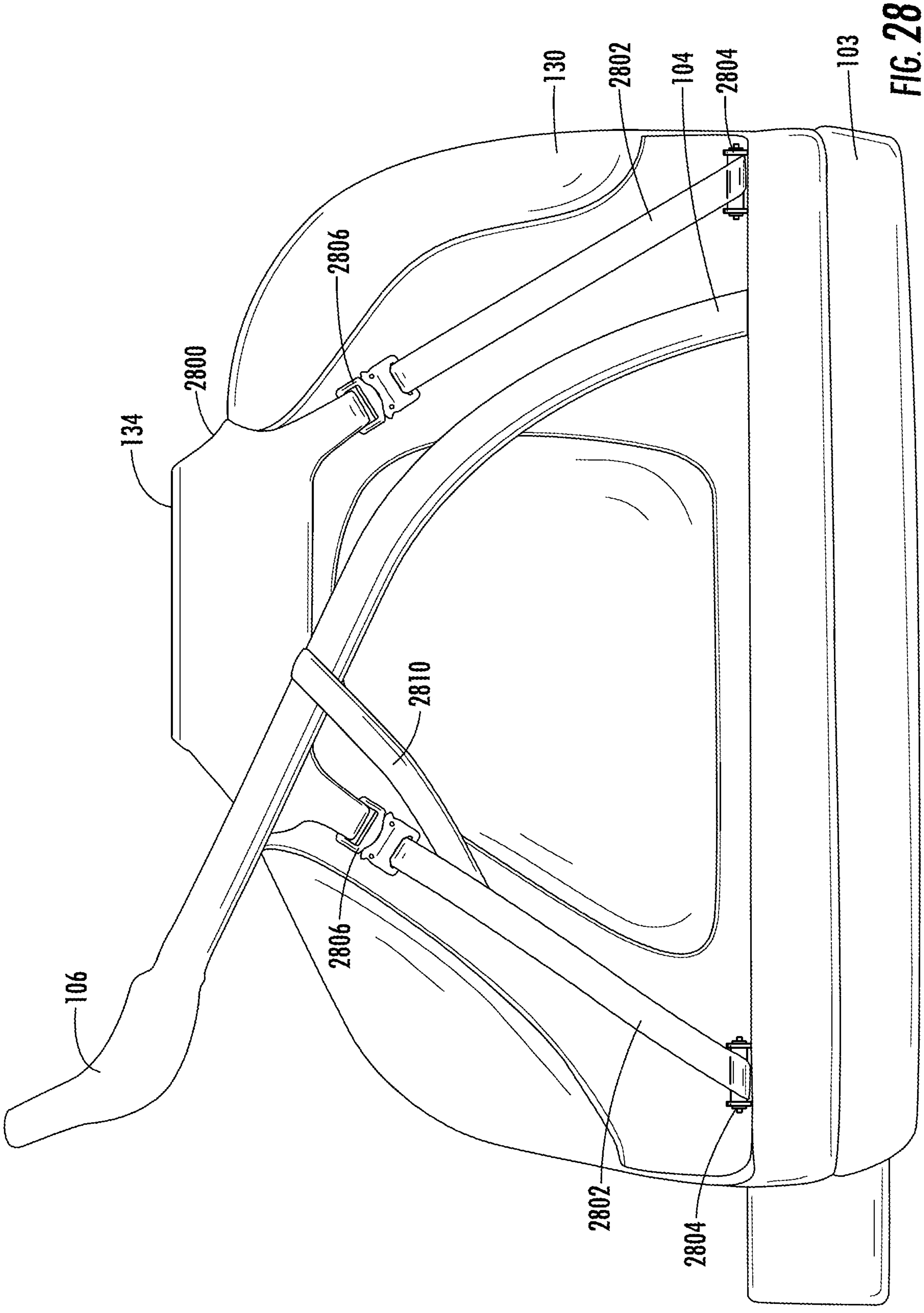
FIG. 28 is a perspective view of a first alternative embodiment of an exercise and therapeutic device, according to an exemplary embodiment.
Figure 29:
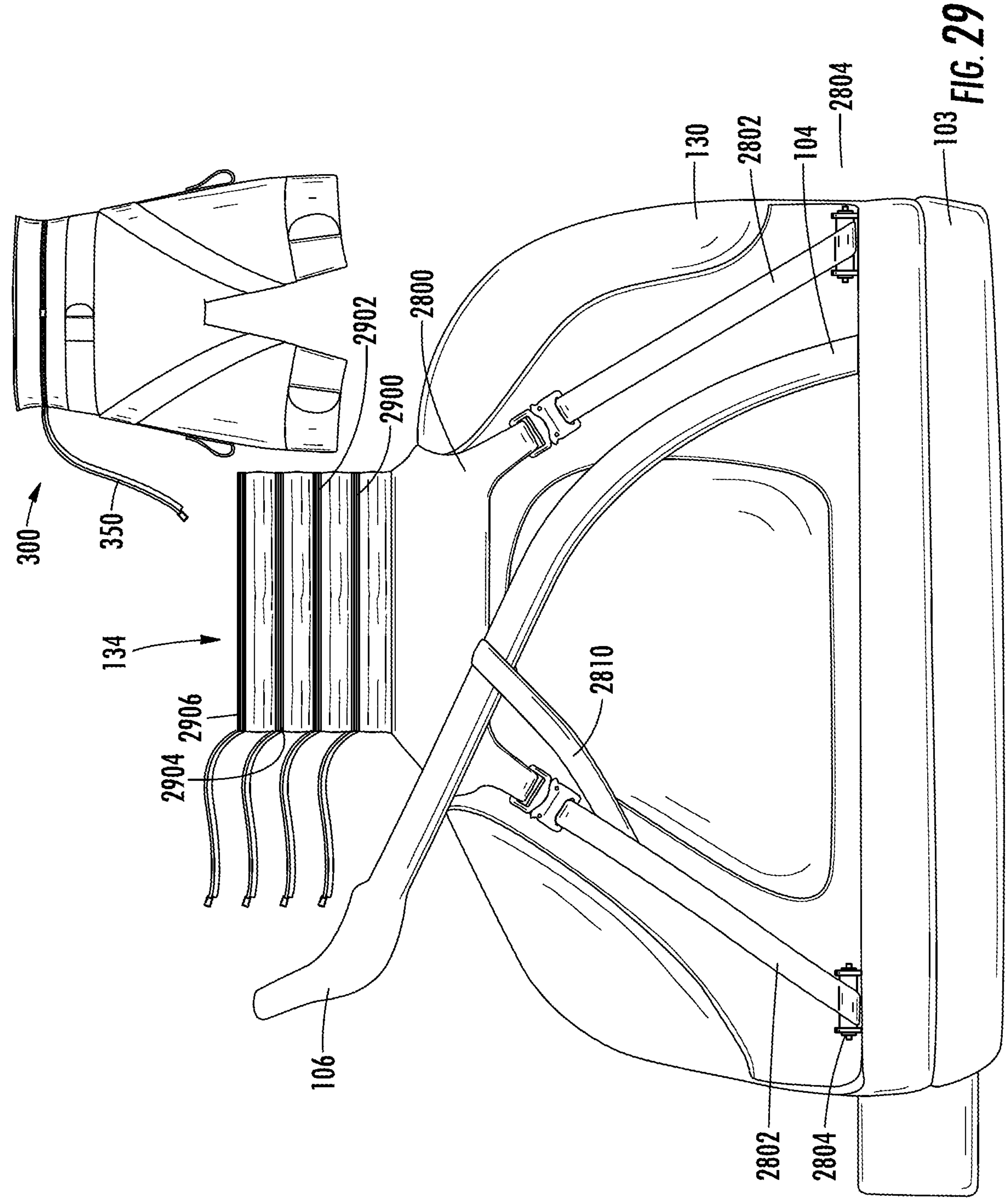
FIG. 29 is a side view of a twelfth alternative embodiment of a height adjustment mechanism for an exercise and therapeutic device, according to an exemplary embodiment.
Figure 30:
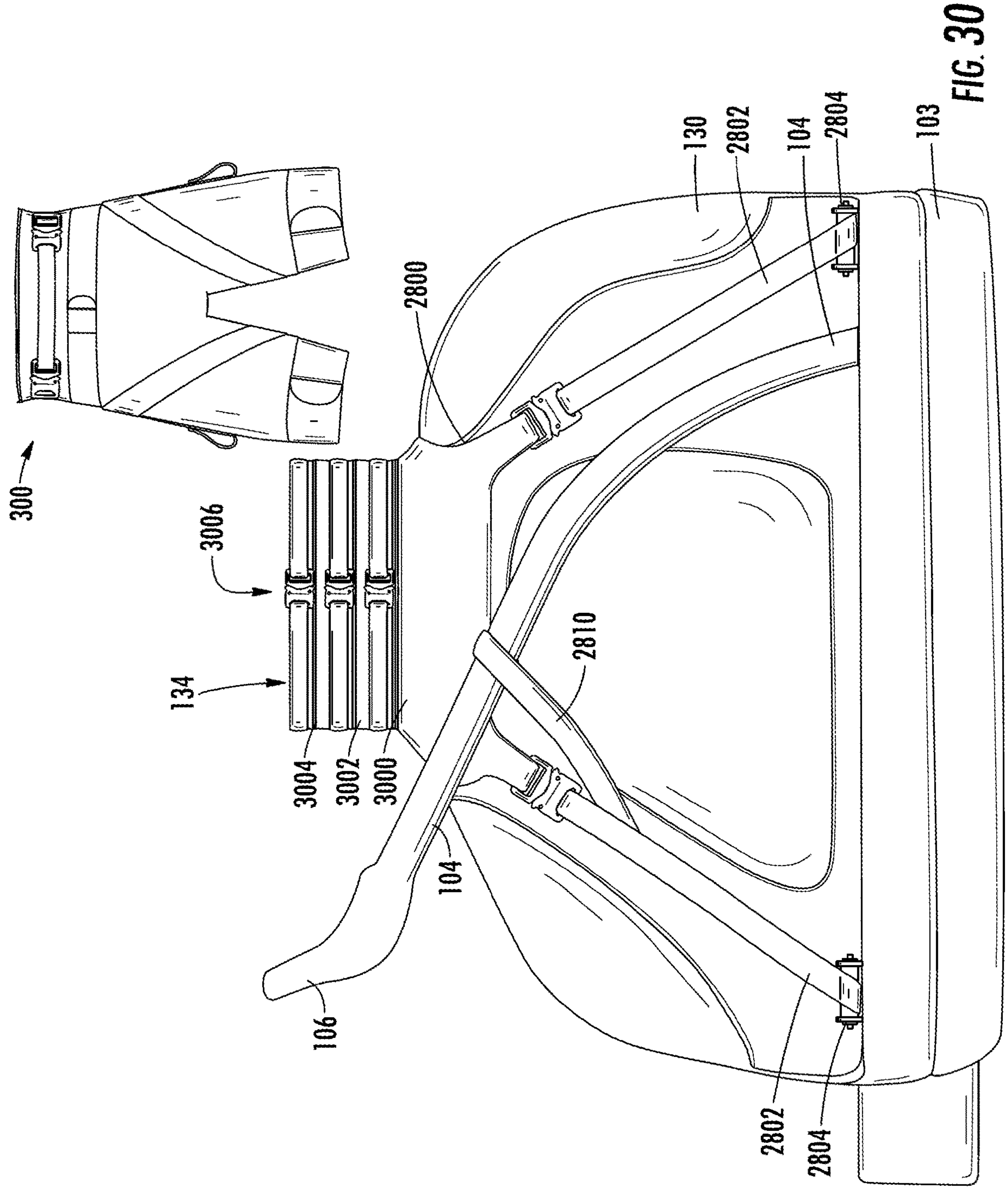
FIG. 30 is a side view of a thirteenth alternative embodiment of a height adjustment mechanism for an exercise and therapeutic device, according to an exemplary embodiment.

Referring now to FIGS. 13-31, various alternative embodiments of the exercise and therapeutic device 100 and components and/or systems therefor are shown. As described in detail below, the various alternative embodiments provide various options for altering, customizing, selecting, etc. the height of the user seal 134 relative to the running surface (i.e., various height adjustment mechanisms). As described in detail below, FIGS. 13-27 and 31 show various structures for adjusting the position of the user seal frame 136 relative to the running surface, while FIGS. 28-30 show embodiments in which a user seal frame 136 is omitted and a top strap 2800 is used to restrict a height of the user seal 134. The dimensions and geometric configuration of the user seal frame 136 may vary to accommodate the various embodiments of FIGS. 13-27 and 31. Additionally, where a side view is shown in FIG. 13-31, it should be understood that a symmetric and/or substantially symmetric arrangement of elements of the device 100 is contemplated by such an embodiment. Furthermore, it should be understood various combinations, rearrangements, etc. of the embodiments of the exercise and therapeutic device 100 and components and/or systems therefor are contemplated by the present disclosure, including symmetric and asymmetric arrangements.

Figure 13:
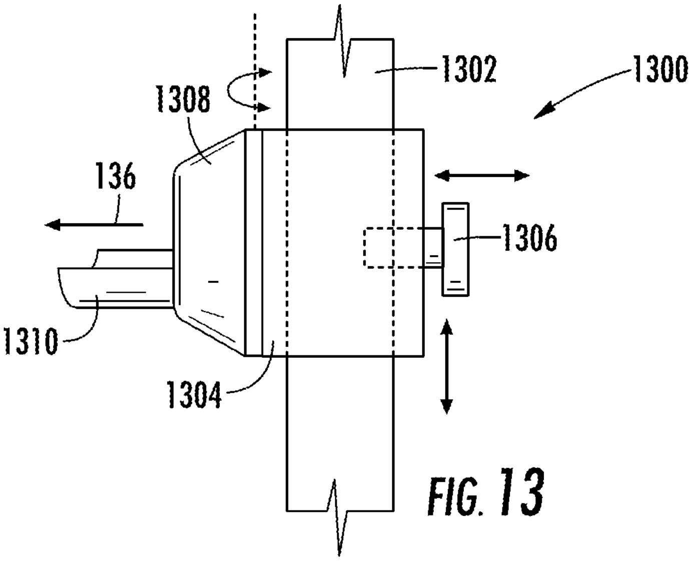
FIG. 13 is a side view of a first alternative height adjustment mechanism, shown as a pin lock, for use with the exercise and therapeutic device of FIG. 1, according to an exemplary embodiment.

Referring now to FIG. 13, a pin lock 1300 for use with a height adjustment mechanism for the exercise and therapeutic device 100 is shown, according to an exemplary embodiment. The pin lock 1300 is shown mounted on a vertical column 1302. The vertical column 1302 may correspond to a front rack 138 and/or a rear rack 140. The position of the pin lock 1300 on the vertical column 1302 is adjustable along the vertical column 1302, such that the pin lock 1300 can be selectively positioned at multiple discrete positions along the vertical column 1302.

The pin lock 1300 is shown to include a collar 1304 (body, ring, slider, cuff, etc.) that surrounds or partially surrounds the vertical column 1302 and is configured to slide along the vertical column 1302, a pin 1306 extending into the collar 1304, a rotating head 1308 coupled to the collar 1304, and a tray 1310 (carrier, receptacle, cart, etc.) extending from the rotating head 1308. In the embodiment shown, the tray 1310 is configured to receive a front peg 158 or a rear peg 160 of the user seal frame 136 to secure the user seal frame 136 to the pin lock 1300. The rotating head 1308 is configured to allow the tray 1310 to rotate slightly (e.g., around an axis of rotation defined by the vertical column 1302) to reduce the difficult of placing the front peg 158 or rear peg 160 in the tray 1310. In other embodiments, the user seal frame is permanently coupled to the rotating head 1308.

The pin 1306 is moveable between a locked position and an unlocked position. In the locked position, the pin 1306 extends through the collar 1304 and into the vertical column 1302. The vertical column 1302 defines a plurality of holes spaced vertically apart from each other. The holes are configured to receive the pin 1306, which thereby controls (sets, establishes, restricts) the vertical distance between the pin lock 1300/user seal frame 136 and the running surface. By extending into a hole of the vertical column 1302, the pin 1306 thereby prevents movement of the collar 1304 relative to the vertical column 1302 in the locked position. In the unlocked position, the pin 1306 is removed from engagement with the vertical support, such that the collar 1304 can move freely relative to the vertical column 1302. Accordingly, in the unlocked position, the relative height or position of the pin lock 1300 along the vertical column 1302 can be adjusted. The pin lock 1300 may include a spring that forces the pin 1306 towards the locked position while allowing a user to apply force to the pin 1306 to overcome the force of the spring and draw the pin 1306 to the unlocked position. The pin lock 1300 thereby facilitates adjustment of the height of the user seal frame 136 relative to the running belt 112.

Figure 14:
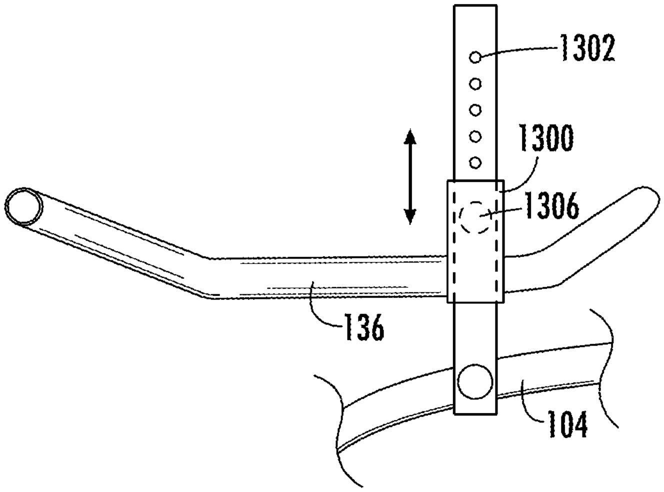
FIG. 14 is a side view of the exercise and therapeutic device of FIG. 1 including the pin lock of FIG. 13, according to an exemplary embodiment.

Referring now to FIG. 14, a side view of a portion of a height adjustment mechanism for the exercise and therapeutic device 100 that includes the pin lock 1300 is shown. In the example shown in FIG. 14, the vertical column 1302 is coupled to the handrail assembly 104 and positioned proximate a front end of the treadmill 102 (e.g., proximate the user console 106). The pin lock 1300 is positioned on the vertical column 1302 and coupled to the user seal frame 136. Accordingly, the position of the user seal frame 136 relative to the handrail assembly 104 is adjustable by moving the pin lock 1300 to various positions along the vertical column 1302. The pin lock 1300 and vertical column 1302 thereby facilitate adjustment of a height of the user seal frame 136 relative to the running belt 112. Although FIG. 14 shows the pin lock 1300 used to adjust a position of a front end of the user seal frame 136 (e.g., of front arms 154), it should be understood that a pin lock 1300 and vertical column 1302 can also or alternatively be used to adjust a height of the rear end of the user seal frame 136 (e.g., of rear arms 156).

Figure 15:
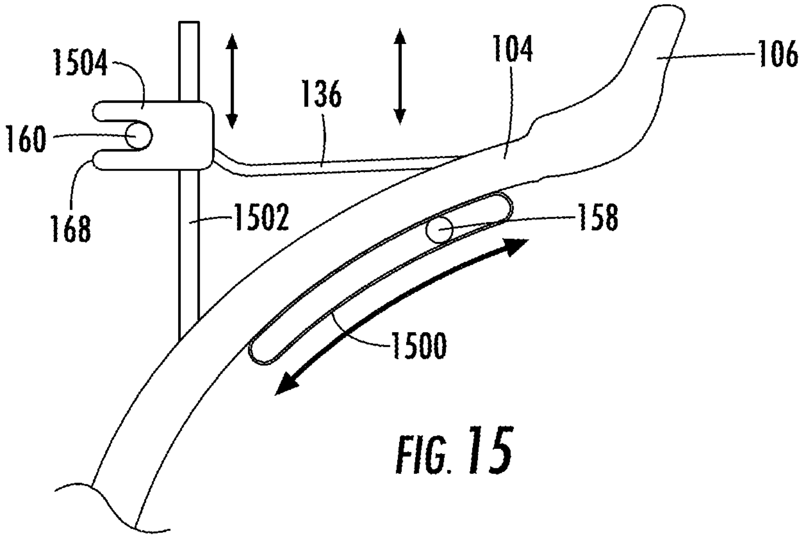
FIG. 15 is a side view of a second alternative embodiment of a height adjustment mechanism of the exercise and therapeutic device of FIG. 1, according to an exemplary embodiment.

Referring now to FIG. 15, a second alternative embodiment of a height adjustment mechanism for the exercise and therapeutic device 100 is shown, according to an exemplary embodiment. As shown in FIG. 15, a track 1500 is coupled along an underside of the handrail assembly 104. The track 1500 is configured to receive front pegs 158 of the user seal frame 136, which extend downward from the user seal frame 136 as shown in FIG. 15. The front pegs 158 can slide along the track 1500 to adjust a position of the user seal frame 136 relative to the handrail assembly 104. The front pegs 158 may include or be rollers (wheels) permanently coupled to the track 1500 or detachably coupled to the track 1500 to enable easy movement of the pegs 158 along the track 1500. Movement of the pegs 158 along the track 1500 facilitates easy on-boarding of a user into the user seal 134 and user seal frame 136.

The track 1500 is configured to allow the user seal frame 136 to be moved between a position that allows a user to enter the user seal 134 and a position suitable for restricting a height of the user seal 134 to a proper height relative to the running surface of the running belt for the particular user when the air chamber 130 is inflated. The track 1500 follows an arcuate path between a rear of the device 100 and a front of the device 100. Movement of the pegs 158 along the track 1500 controls a height of the pegs 158 and the user seal frame 136 relative to the running surface. When the pegs 158 are positioned at a point in the track 1500 closest to the rear of the device 100, the pegs 158 and seal frame 136 are vertically closest to the running surface. The pegs 158 and seal frame 136 are at the maximum vertical height from the running surface when the pegs 158 are positioned at a point in the track 1500 closest to the front of the device 100. The track 1500 may be positioned below and aligned with the handrail assembly 104 (e.g., coupled to an underside of the handrail assembly 104) such that the track 1500 is positioned to beneficially avoid interference with running or other user behavior on the running surface.

FIG. 15 also shows a rear peg 160 supported in a notch 168. In the example of FIG. 15, the notch 168 is included with a pin lock 1504 coupled to a vertical support 1502. The pin lock 1504 may be adjustable along the vertical support 1502 as described above for the pin lock 1300 of FIGS. 13-14 to facilitate a height adjustment of the user seal frame 136. The rear peg 160 can be removed from the notch 168 to allow the user seal frame 136 to be moved to a position that allows a user to enter the user seal 134, and positioned in the notch 168 as shown in FIG. 15 to secure the user seal frame 136 in a position suitable for restricting a height of the user seal 134 to a proper height for the particular user when the air chamber 130 is inflated.

Figure 16:
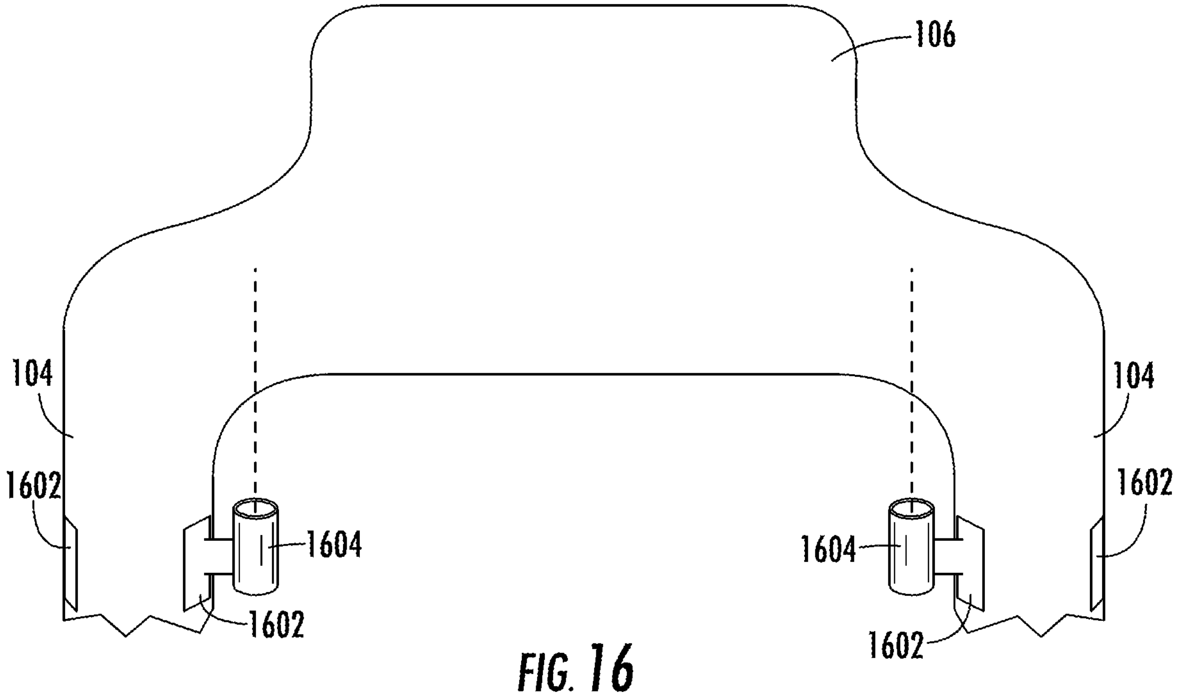
FIG. 16 is a rear view of a third alternative embodiment of a height adjustment mechanism of the exercise and therapeutic device of FIG. 1, according to an exemplary embodiment.

Referring now to FIG. 16, a front view of a third alternative embodiment of a height adjustment mechanism for the exercise and therapeutic device 100 is shown, according to an exemplary embodiment. FIG. 16 shows mounts 1600 coupled to the handrail assembly 104. Mounts 1600 are shown to include brackets 1602 coupled to vertical poles 1604. The position of the brackets 1602 along the handrail assembly 104 is adjustable. In some embodiments, the brackets 1602 each include a clamp that can be loosened to allow movement of the bracket and retightened to restrict or substantially prevent movement of the bracket 1602. In some embodiments, the brackets 1602 include a pin lock (e.g., similar to the pin lock 1300) are configured to slid along the handrail assembly 104 unless locked in position by the pin lock. The vertical poles 1604 can be coupled to the user seal frame 136, for example using the pin lock 1300 of FIG. 13. The adjustability of the positon of the brackets 1602 along the handrail assembly 104 allows adjustment of the position of the user seal frame 136 along a longitudinal direction (i.e., back-to-front along the treadmill 102) while the adjustability of vertical position along the vertical poles 1604 allows vertical adjustment of the position of the user seal frame 136 relative to the running surface.

Figure 17:
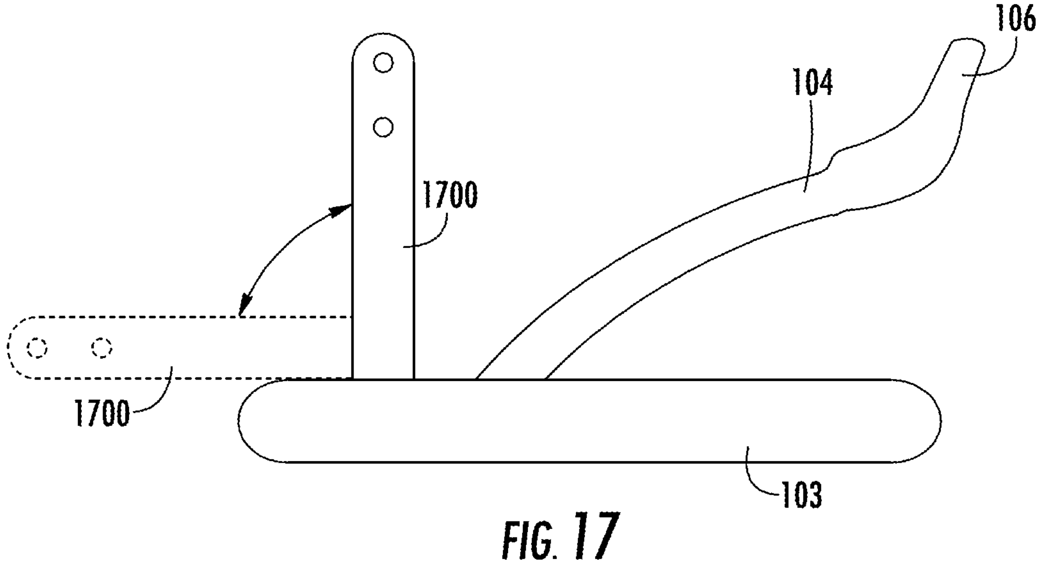
FIG. 17 is a side view of a fourth alternative embodiment of a height adjustment mechanism, of the exercise and therapeutic device of FIG. 1, according to an exemplary embodiment.

Referring now to FIG. 17, a fourth alternative embodiment of a height adjustment mechanism for the exercise and therapeutic device 100 is shown. In FIG. 17, a rotatable rear rack 1700 is included. The rotatable rear rack 1700 is rotatable between an upright position and a horizontal position about an axis that is transverse to a longitudinal axis of the running surface. The rotatable rear rack 1700 includes a hinge coupled to the treadmill 102 (e.g., to the treadmill frame 103). The hinge may include a latch or locking mechanism configured to releaseably secure the rotatable rear rack 1700 in the upright position or horizontal position. In some embodiments, the hinge is motorized and configured to provide automated rotation between the upright position and the horizontal position.

In the upright position, the rotatable rear rack 1700 is spaced furthest from and oriented perpendicular to the running surface and is configured to hold the user seal frame 136 over the running surface as shown in FIG. 1. In some embodiments, the user seal frame 136 is coupled to the rotatable rear rack 1700 such that the user seal frame remains attached to the rotatable rear rack 1700 during normal startup and operation of the exercise and therapeutic device 100. In other embodiments, the rotatable rear rack 1700 may include a notch 168 as for the rear rack 140 of FIGS. 1-4.

In the horizontal position, the rotatable rear rack 1700 is rotated away from the user console 106 to an orientation approximately parallel with the running surface of the running belt 112. Accordingly, when the rotatable rear rack 1700 moves from the upright position to the horizontal position, the rotatable rear rack 1700 carries the user seal frame 136 to a position that allows a user to enter or exit the user seal 134. Rotation of the rotatable rear rack 1700 thereby facilitates easy entry to and exit from the user seal 134 in addition to user-friendly repositioning of the user seal frame 136 from a position that facilitate entry/exit to a position suitable for inflation of the air chamber 130 and operation of the exercise and therapeutic device 100.

Figure 18:
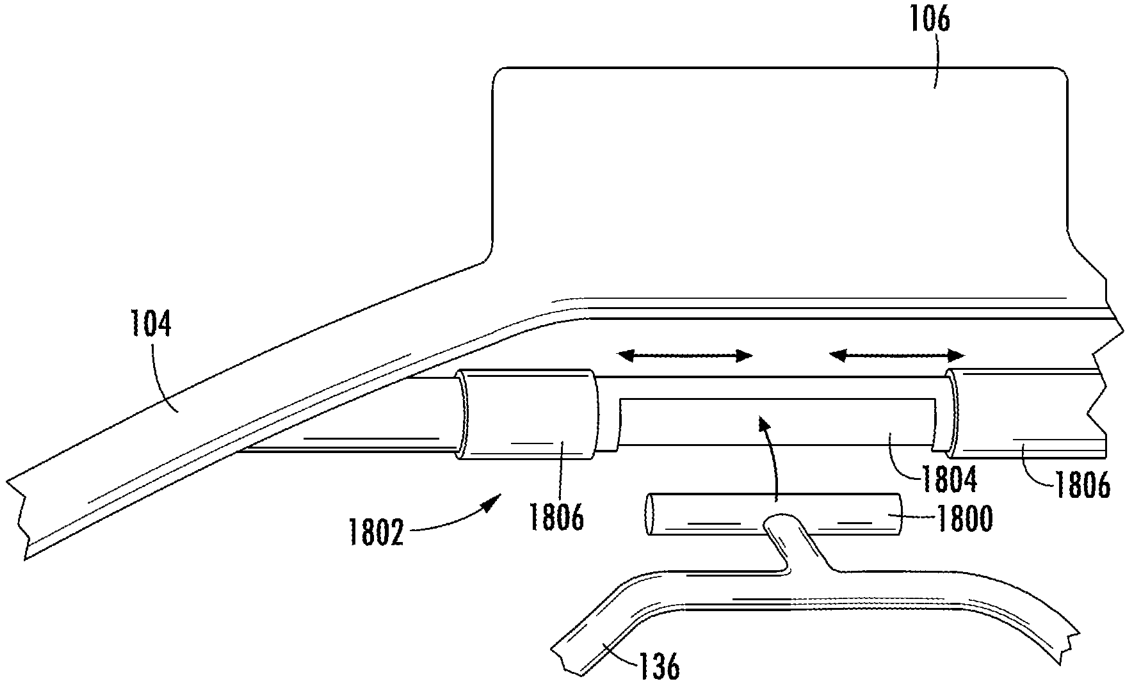
FIG. 18 is a perspective view of a fifth alternative embodiment of a height adjustment mechanism of the exercise and therapeutic device of FIG. 1, according to an exemplary embodiment.
Figure 19:
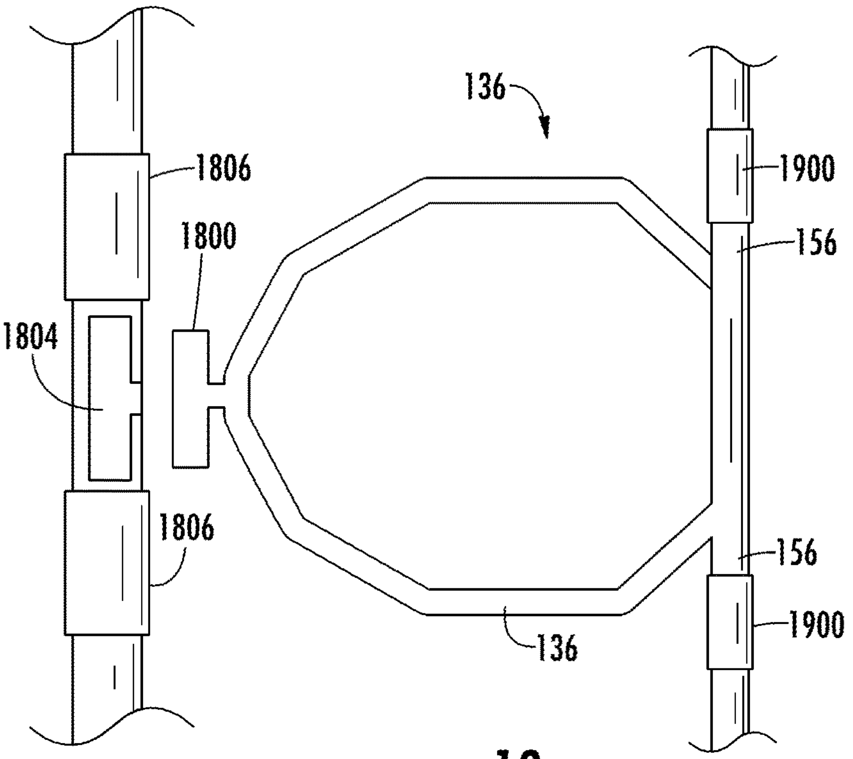
FIG. 19 is a top view of the fifth alternative embodiment of a height adjustment mechanism of the exercise and therapeutic device of FIG. 1, according to an exemplary embodiment.

Referring now to FIGS. 18-19, a fifth alternative embodiment of a height adjustment mechanism for the exercise and therapeutic device 100 is shown, according to an exemplary embodiment. As shown in FIG. 18-19, the user seal frame 136 includes a head 1800 (e.g. front portion, extension, front member, protrusion, knob, arms) extending from a front end of the user seal frame 136. In the embodiment shown, the head 1800 is T-shaped; in other embodiments, a different shape may be used. A crossbar 1802 is coupled to the handrail assembly 104 proximate the user console 106 and the crossbar 1802 includes a receptacle 1804 that is shaped to receive the head 1800, such that the head 1800 can be inserted into the receptacle 1804 (i.e., into the crossbar 1802) to be supported by the crossbar 1802. As shown in FIGS. 18-19, a pair of sliders 1806 are positioned on the crossbar 1802 on opposing sides of the receptacle 1804. The sliders 1806 are configured to slide along the crossbar 1802 to selectively cover (e.g., partially cover) and uncover the receptacle 1804. When the sliders 1806 are not covering the receptacle 1804, the head 1800 can be inserted into the receptacle 1804. When the head 1800 is positioned in the receptacle 1804 and the sliders 1806 are positioned to cover the receptacle 1804, the sliders 1806 prevent removal of the head 1800 from the receptacle 1804.

In the embodiment of FIGS. 18-19, the head 1800 can rotate within the receptacle 1804 such that the user seal frame 136 can rotate about an axis defined by the crossbar 1802. The position and orientation of the user seal frame 136 relative to the running belt 112 can therefore be adjusted by adjusting the height of the rear arms 156 of the user seal frame 136 to rotate about the crossbar 1802. In various embodiments, the rear arms 156 of the user seal frame 136 can be supported on one or more of the various support structures described herein, for example rear racks 140 of FIGS. 18-19, rotatable rear rack 1700 of FIG. 17, pin lock 1504 of FIG. 15, or various other structures described below. In the example shown in FIG. 19, the rear arms 156 include locking collars 1900. The locking collars 1900 slide along the rear arms 156 and selectively cover/uncover receptacles in the rear arms 156 configured to receive support members from a rear support structure of the exercise and therapeutic device 100. The locking collars 1900 may operate in a similar manner as the sliders 1806 to secure the rear arms 156 to a rear support structure.

Figure 20:
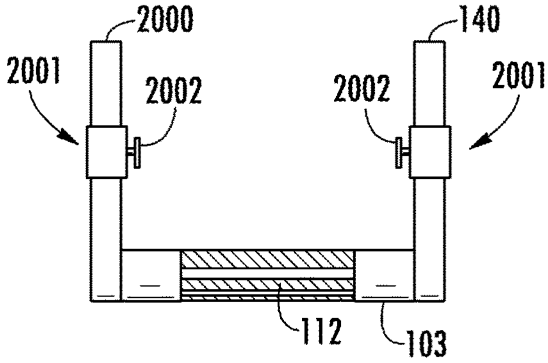
FIG. 20 is a rear view of a sixth alternative embodiment of a height adjustment mechanism of the exercise and therapeutic device of FIG. 1, according to an exemplary embodiment.
Figure 21:
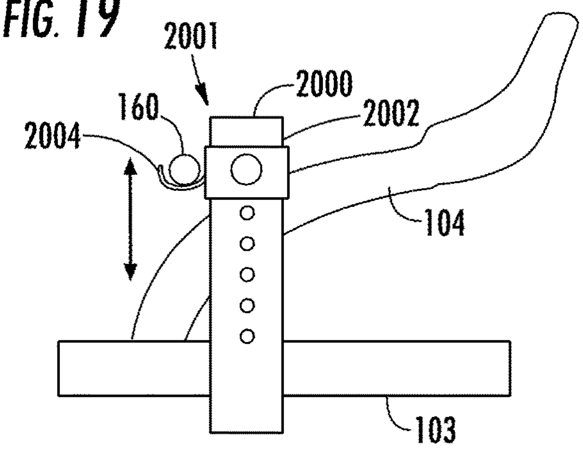
FIG. 21 is a side view of the sixth alternative embodiment of the height adjustment mechanism of FIG. 20, according to an exemplary embodiment.
Figure 22:
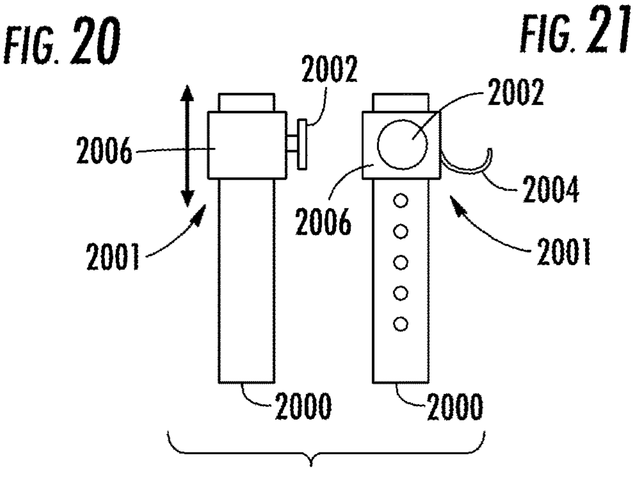
FIG. 22 is close-up view of the sixth alternative embodiment of the height adjustment mechanism of FIG. 20, according to an exemplary embodiment.

Referring now to FIGS. 20-22, a sixth embodiment of a height adjustment mechanism for the exercise and therapeutic device 100 is shown, according to an exemplary embodiment. In the embodiment of FIGS. 20-22, the exercise and therapeutic device 100 includes a pair of rear columns 2000 (supports, posts, frames, poles, etc.). The rear columns 2000 extend vertically (i.e., perpendicular to the running belt 112) and are positioned on opposing sides of the running belt 112. A pair of pin locks 2001 is positioned on the rear columns 2000, such that one pin lock 2001 is positioned on each rear column 2000 in the example shown.

Each pin lock 2001 includes a collar 2006, a pin 2002 extending through the collar 2006, and a hook 2004. The collar 2006 is configured to surround or partially surround the corresponding rear column 2000. The pin 2002 is configured to extend through the collar 2006 and into the rear column 2000 to secure the collar 2006 in position relative to the rear column 2000. The pin 2002 is also configured to be removed from the rear column 2000 to allow the collar 2006 to be repositioned along the rear column 2000.

The hook 2004 extends from the collar 2006 and is configured to receive and support a rear peg 160 of the user seal frame 136. In the example shown in FIGS. 20-22, the hook 2004 is oriented at an approximately right angle to the pin 2002. In other embodiments, the hook 2004 may be positioned on the collar 2006 at other orientations relative to the pin 2002 (e.g., 180 degrees from the pin). The height of the hook 2004 relative to the running belt 112 can be adjusted by repositioning the pin lock 2001 along the rear column 2000, thereby adjusting a height of the user seal frame 136 supported by the hook 2004.

Furthermore, the hook 2004 and the pin 2002 may be positioned on various sides of the rear columns 2000. For example, FIG. 20 shows the pins 2002 positioned on medial sides of the columns 2000, with the hooks 2004 positioned on an anterior side of the columns 2000, while FIG. 21 shows the pins 2002 positioned on lateral sides of the columns 2000 with the hooks 2004 positioned on posterior sides of the columns 2000. It should be understood that various such arrangements are possible.

Figure 23:
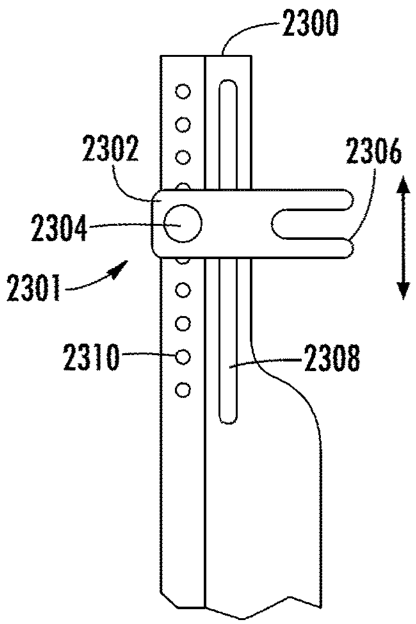
FIG. 23 is a side view of seventh alternative embodiment of a height adjustment mechanism for the exercise and therapeutic device of FIG. 1, according to an exemplary embodiment.

Referring now to FIG. 23, a seventh embodiment of a height adjustment mechanism for use with the exercise and therapeutic device 100 including support column 2300 with a pin lock 2301 is shown, according to an exemplary embodiment. The support column 2300 includes a row of holes 2310 and a slot 2308 that extend along the support column 2300. The pin lock 2301 includes a collar 2302 and a pin 2304. The pin 2304 extends through the collar 2302 and can be selectively inserted and removed from the various holes 2310 of the support column 2300. When the pin 2304 is inserted into a hole 2310, the pin 2304 prevents the collar 2302 from moving relative to the support structure. When the pin 2304 is not inserted into a hole 2310, the collar 2302 can be moved along the support column 2300.

The collar 2302 may include a member that extends into the slot 2308. The slot 2308 may thereby guide the collar 2302 to move along the support column 2300. In some embodiments, the slot 2308 includes a ratcheting structure that facilitates the user in lifting the collar 2302 along the support column 2300. For example, the slot 2308 may be configured to allow a user to freely move the collar 2302 upwards along the support column 2300 but prevent the collar 2302 from moving downwards along the support column 2300. In such a case, the support column 2300 and/or the pin lock 2301 may include a release button or lever that is engageable by a user to allow the collar 2302 to move downwards along the support column 2300.

The collar 2302 includes a slot 2306 that extends beyond the support column 2300. The slot 2306 is configured to receive a front peg 158 or a rear peg 160 of the user seal frame 136, depending on placement of the support column 2300 on the exercise and therapeutic device 100. The support column 2300 with the pin lock 2301 thereby facilitate placement of the user seal frame 136 at a user-selectable height.

Figure 24:
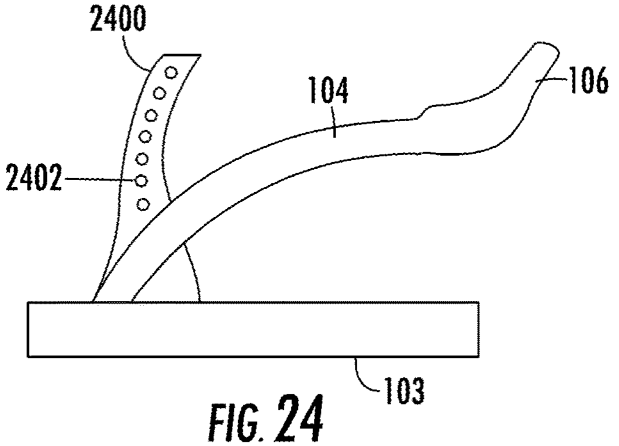
FIG. 24 is a side view of an eighth alternative embodiment of a height adjustment mechanism for the exercise and therapeutic device of FIG. 1, according to an exemplary embodiment.

Referring now to FIG. 24, an eighth exemplary embodiment of a height adjustment mechanism for the exercise and therapeutic device 100 is shown. In the embodiment of FIG. 24, the exercise and therapeutic device 100 includes a front mount for the user seal frame 136 which is not adjustable in position but allows rotation of the user seal frame 136, for example as shown in FIGS. 18-19.

As shown in FIG. 24, the exercise and therapeutic device 100 includes a curved rear rack 2400. The curved rear rack 2400 is configured to receive a rear peg 160 of the user seal frame 136 at each of multiple receptacles 2402. The multiple receptacles 2402 are arranged in a curve having a radius approximately equal to a length of the user seal frame 136. The multiple receptacles 2402 are spaced from a front mount for the user seal frame 136 such that the user seal frame 136 can be rotated to extend from the front mount to any of the receptacles 2402. The position and orientation of the user seal frame 136 relative to the running belt 112 can therefore be adjusted by selecting one of the multiple receptacles 2402 to receive and support the rear peg 160 of the user seal frame 136. Although a single curved rear rack 2400 is visible in the side view of FIG. 24, it should be understood that in preferred embodiments a second curved rear rack 2400 is also included, with the pair of curved rear racks 2400 positioned on opposing sides of the running belt 112.

Figure 25:
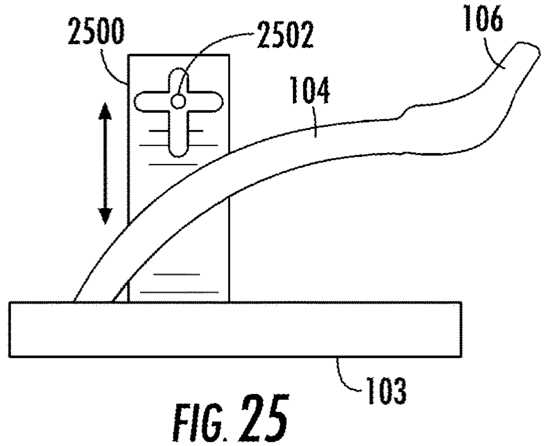
FIG. 25 is a side view of a ninth alternative embodiment of a height adjustment mechanism for the exercise and therapeutic device of FIG. 1, according to an exemplary embodiment.

Referring now to FIG. 25, an ninth exemplary embodiment a height adjustment mechanism for the exercise and therapeutic device 100 is shown. In the embodiment of FIG. 25, the exercise and therapeutic device 100 includes a front mount for the user seal frame 136 which is not adjustable in position but allows rotation of the user seal frame 136, for example as shown in FIGS. 18-19.

As shown in FIG. 25, the exercise and therapeutic device 100 includes a two-degree-of-freedom mounting system 2500. The two-degree-of-freedom mounting system 2500 is configured to receive a rear peg 160 of the user seal frame 136 at a mounting point 2502. The position of the mounting point 2502 is adjustable in two dimensions on the two-degree-of-freedom mounting system 2500, shown as a vertical dimension (orthogonal to the running belt 112) and a horizontal direction (parallel to the running belt 112). The two-degree-of-freedom mounting system 2500 may include a combination of one or more tracks, slots, trays, etc. configured to facilitate adjustment of the position of the mounting point 2502. The two-degree-of-freedom mounting system 2500 allows the position and orientation of the user seal frame 136 to be selected by a user by allowing selection of the position of the mounting point 2502. Although a two-degree-of-freedom mounting system 2500, it should be understood that in preferred embodiments a second two-degree-of-freedom mounting system 2500 is also included, with the pair of two-degree-of-freedom mounting systems 2500 positioned on opposing sides of the running belt 112.

Figure 26:
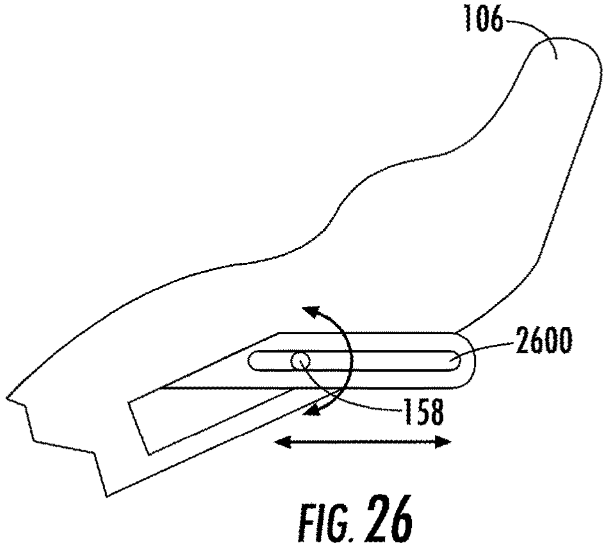
FIG. 26 is a side view of a tenth alternative embodiment of a height adjustment mechanism for the exercise and therapeutic device of FIG. 1, according to an exemplary embodiment.

Referring now to FIG. 26, a tenth exemplary embodiment of a height adjustment mechanism for the exercise and therapeutic device 100 is shown. As shown in FIG. 26 a slot 2600 is formed in the handrail assembly 104 proximate the user console 106. The slot 2600 is oriented parallel to the running belt 112. The slot 2600 is configured to receive a front peg 158. Although a single slot 2600 is visible from the side view of FIG. 26, in preferred embodiments a second slot 2600 is also included with the pair of slots 2600 positioned symmetrically on opposing sides of the user console 106. The slot 2600 is configured to receive and support a front peg 158 of the user seal frame 136. The slot 2600 allows the front peg 158 to slid along the slot 2600 to allow horizontal movement of the user seal frame 136. The slot 2600 also allows the front peg 158 to rotate within the slot 2600, thereby allowing the user seal frame 136 to rotate about an axis defined by the front peg 158. The slot 2600 can be used with various rear support structures (e.g., curved rear rack 2400 of FIG. 24, two-degree-of-freedom mounting system 2500 of FIG. 25, rear racks 140 of FIGS. 1-4, etc.) to secure the user seal frame 136 is a selected position and orientation.

Figure 27:
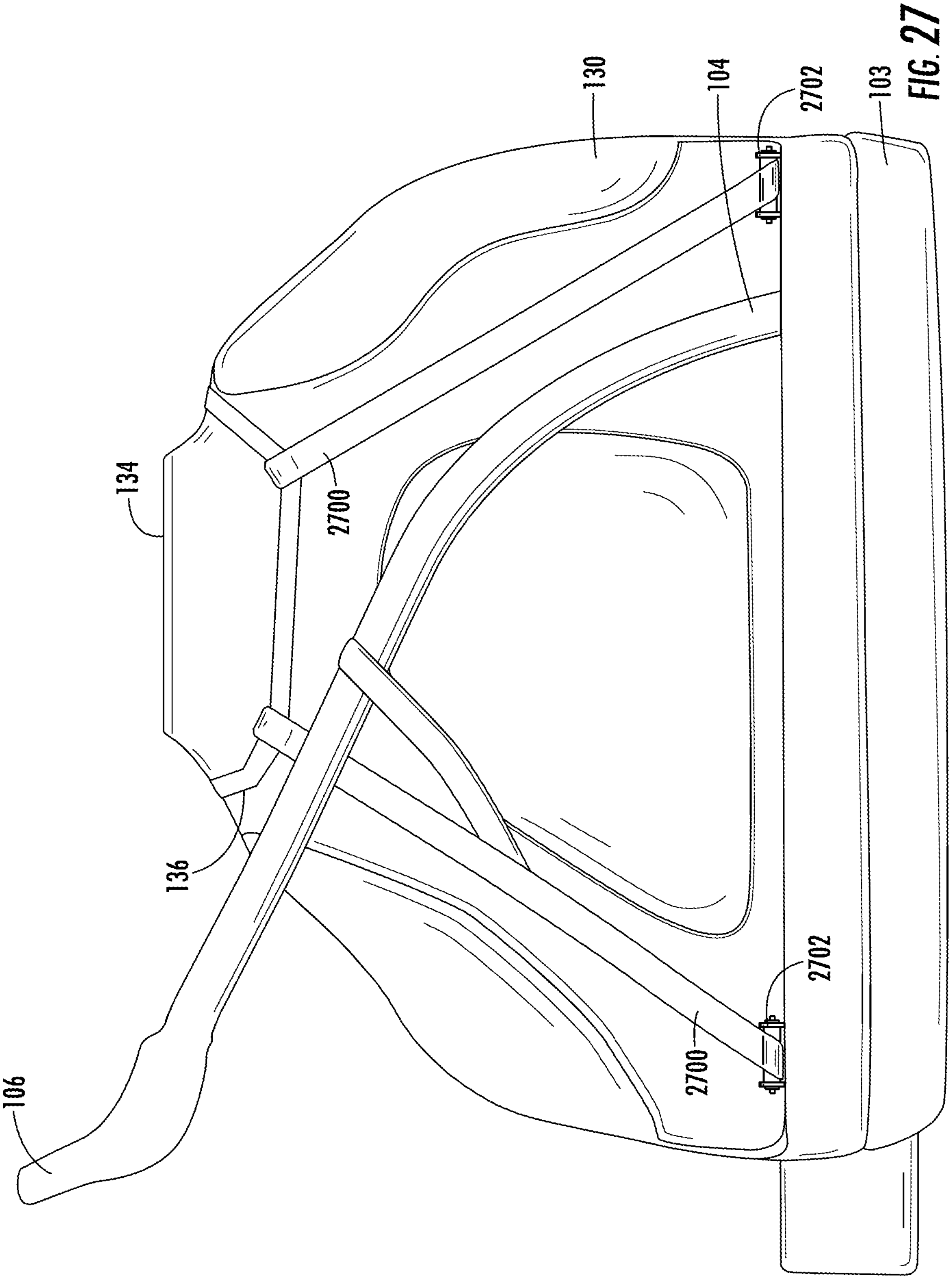
FIG. 27 is a side view of a eleventh alternative embodiment a height adjustment mechanism for an exercise and therapeutic device, according to an exemplary embodiment.

Referring now to FIG. 27, an eleventh exemplary embodiment of a height adjustment mechanism for the exercise and therapeutic device 100 is shown. As shown in FIG. 27, the exercise and therapeutic device 100 includes multiple straps 2700. The straps 2700 are coupled to the user seal frame 136 and extend from the user seal frame 136 to the treadmill frame 103. The straps 2700 are coupled to the treadmill frame 103 by fasteners 2702. When the air chamber 130 is inflated, the straps provide tension that limits or restricts movement of the user seal frame 136 away from the treadmill frame 103. The straps 2700 are substantially inelastic, such that the length of the straps 2700 remains substantially constant when tension is applied to the straps 2700. The length of the straps 2700 therefore determines the maximum height of the user seal frame 136 (i.e., a maximum displacement of the user seal frame 136 from the running belt 112), which in turn determines the height of the user seal 134 at full inflation of the air chamber 130. Accordingly, the straps 2700 as shown in FIG. 27 can be used in place of the front rack 138 and rear rack 140 of FIGS. 1-4 and/or other similar support structures of FIGS. 13-26. In the embodiment shown, four straps 2700 are included. In other embodiments, a different number of straps may be used. The straps 2700 can include coated ends or edges to reduce friction, rubbing, wear, etc. on the air chamber 130 (e.g., silicone coating, polytetrafluoroethylene coating (e.g., Teflon®), rubberized edges, etc.).

In some embodiments of FIG. 27, the length of the straps 2700 is adjustable to adjust the height of the user seal frame 136 and the user seal 134 to accommodate users of various heights. In the embodiment shown, each fastener 2702 includes a winch (e.g., a motorized spool) that is controllable (e.g., by the controller 110) to automatically alter a length of the straps 2700 disposed between the fasteners 2702. For example, the fasteners 2702 may be controlled in response to a user input to the user console 106 indicating a height of the user or indicating a command to raise or lower the user seal 134. Thus, the fasteners 2702 are rotatable to rotate the straps in a tightening or loosening manner. In other embodiments, the fasteners 2702 include a quick-release strap length adjuster or buckle configured to allow a user to manually adjust the length of the straps 2700 disposed between the fasteners 2702 and the user seal frame 136. In other embodiments, the straps include hook-and-loop material (e.g., VELCRO™) that allows each strap to be adjustably and selectively fastened to itself, and the fasteners 2702 include a loop through which the straps extend. In such embodiments, the coupling of each strap to itself by the hook-and-loop material can be adjusted to adjust a length of the strap disposed between the fastener 2702 and the user seal frame 136. It should be understood that various automatic and manual length-adjustment mechanisms are contemplated by the present disclosure. Additionally, markings, scales, numberings, etc. can be included on the straps and/or on the air chamber 130 to facilitate a user in ascertaining a current length of the straps between the fastener 2702 and the user seal frame 136 (i.e., a height setting for the user seal 134).

Referring now to FIG. 28, a first alternative embodiment of the exercise and therapeutic device 100 is shown. As shown in FIG. 28, the exercise and therapeutic device 100 includes multiple side straps 2802 coupled to the treadmill frame 103 by fasteners 2804. The multiple side straps 2800 are also coupled to a top strap 2800. The top strap 2800 is formed as a loop that extends around the user seal 134. The top strap 2800 is coupled to each side strap 2800, respectively, by a buckle 2806. Alternatively, hook and loop fastening material (e.g., VELCRO™) may be used to limit the movement of one strap relative to another. In the embodiment shown, four side straps 2800 are included. FIG. 28 also shows a support strap 2810 coupled to a side strap 2800 and the handrail assembly 104. The support strap 2810 is configured to provide lateral stability to the air chamber 130.

When the air chamber 130 is inflated, the side straps 2802 are fully extended and provide tension that restricts movement of the top strap 2800 away from the treadmill frame 103. The side straps 2802 are substantially inelastic, such that the length of the side straps 2802 remains substantially constant when tension is applied to the straps 2802. The length of the straps 2700 therefore determines the maximum height of the top strap 2800 (i.e., a maximum displacement of the top strap 2800 from the running belt 112). The top strap 2800 is also substantially inelastic, such that the top strap 2800 restricts expansion of the air chamber 130 when coupled to the side straps 2800. Thus, the length of side straps 2802 (i.e., the position of the top strap 2800) determines the height of the user seal 134 at full inflation of the air chamber 130. In some embodiments, the length of the side straps 2802 can be adjusted as described above for the straps 2700 and fasteners 2702 of FIG. 27 to adjust the height of the top strap 2800 and the user seal 134 to accommodate users of various heights.

In other embodiments, a longitudinal strap extends from the fastener 2804 located proximate the front end 116 of the treadmill 102 and along the user seal 134 (e.g., a long a top of the air chamber 134) to the fastener 2804 located proximate the rear end 118 of the treadmill 102. In such embodiments the longitudinal strap extends along both a side and a top of the air chamber 130. The longitudinal strap may be positioned in one or more sleeves or loops of the air chamber 130 (i.e., positioned on the outside of the air chamber 130) which restrict lateral and/or vertical movement of the longitudinal strap relative to the air chamber 130. When the air chamber 130 is inflated, the longitudinal strap is configured to restrict expansion of the air chamber 130. In some embodiments, lateral straps may be included in a similar configuration as described here for longitudinal straps.

Changes in the length of the longitudinal strap between the two fasteners 2804 can change the height of the user seal 134 when the air chamber 130 is inflated. The longitudinal strap may be adjustable at one or both fasteners 2804. For example, in some embodiments, the longitudinal strap may be fixedly coupled (i.e., non-adjustable) at the fastener 2804 located proximate the front end 116 of the treadmill 102, and may extend through a loop of the fastener 2804 located proximate the rear end 118 of the treadmill 102. In such embodiments, the longitudinal strap includes hook-and-loop material that allows the longitudinal strap to be coupled to itself (e.g., with hooks positioned along the longitudinal strap substantially on one side of the fastener 2804 and loops positioned along the longitudinal strap substantially on the opposing side of the fastener 2804) such that the amount of the longitudinal strap positioned on either side of the fastener 2804 can be selectively secured. In such embodiments, the height of the user seal 134 when the air chamber 130 is inflated can be selected by altering the amount of the longitudinal strap positioned on either side of the fastener 2804.

In some embodiments, a scale (gradation, numbering, etc.) is positioned along the longitudinal strap. The hook-and-loop material allows an end of the longitudinal strap to be coupled to the longitudinal strap along the scale, such that a given position of the end of the longitudinal strap corresponds to a value of the scale. Such scale values may correspond to height settings for the offloading system 108 (e.g., as described above with reference to notches 168), which may be used by a user in selecting the position of the longitudinal strap and or for inputting height setting information into the user console 106. Such scale values may also correspond to a user height (e.g., 6', 5'3", etc.). In operation, therefore, an attendant may Velcro (when the straps are coupled via Velcro) the strap onto itself at an indicator associated with the height of the user. This enables a quick start methodology for the user to being using the unit without tailoring the user seal frame (as in the earlier embodiments) to the user's particular height. In certain embodiments, this height designation (or scale if heights are not used) may be used an input to control the inflation in the air chamber. Similar charts as described herein above may be implemented with the unit and relate to the scale on the Velcro straps. As also described above, coatings may be applied to the straps to prevent them from rubbing adversely against the air chamber in order to maintain the integrity of the air chamber.

Referring now to FIG. 29, a twelfth exemplary embodiment of the exercise and therapeutic device 100 is shown. As shown in FIG. 29, the exercise and therapeutic device 100 includes a top strap 2800 and side straps 2802 that restrict an inflation height of the air chamber 130 based on a length of the side straps 2802 as described above with reference to FIG. 30. In the example of FIG. 29, the side straps 2802 have a fixed length such that the inflation height of the air chamber 130 is not adjustable.

As shown in FIG. 29, the user seal 134 includes multiple seal levels. The multiple seal levels include a first seal level 2900, a second seal level 2902, a third seal level 2904, and a fourth seal level 2906 arranged in series at progressively further distances from the running belt 112. In the example of FIG. 29, each seal level 2900-2906 includes a zipper that allows a zipper 350 of user seal shorts 300 to be coupled to the user seal 134 at a selected seal level (i.e., at one of the first seal level 2900, second seal level 2902, third seal level 2904, or a fourth seal level 2906). The user shorts 300 can thereby be coupled to and sealed to the user seal 134 at various heights relative to the running belt 112, facilitating adjustment to accommodate users of various leg lengths.

Referring now to FIG. 30, a thirteenth exemplary embodiment of the exercise and therapeutic device 100 is shown. As shown in FIG. 29, the exercise and therapeutic device 100 includes a top strap 2800 and side straps 2802 that restrict an inflation height of the air chamber 130 based on a length of the side straps 2802 as described above with reference to FIG. 30. In the example of FIG. 29, the side straps 2802 have a fixed length such that the inflation height of the air chamber 130 is not adjustable.

As shown in FIG. 30, the user seal includes multiple seal levels. The multiple seal levels include a first seal level 3000, a second seal level 3002, and a third seal level 3004, arranged in series at progressively further distances from the running belt 112. In the example of FIG. 30, each seal level 3000-3004 includes a buckle 3006 that allows the user shorts 300 to be coupled to the user seal 134 at a selected seal level (i.e., at one of the first seal level 3000, second seal level 3002, or third seal level 3004). The user shorts 300 can thereby be coupled to and sealed to the user seal 134 at various heights relative to the running belt 112, facilitating adjustment to accommodate users of various leg lengths.

Figure 31:
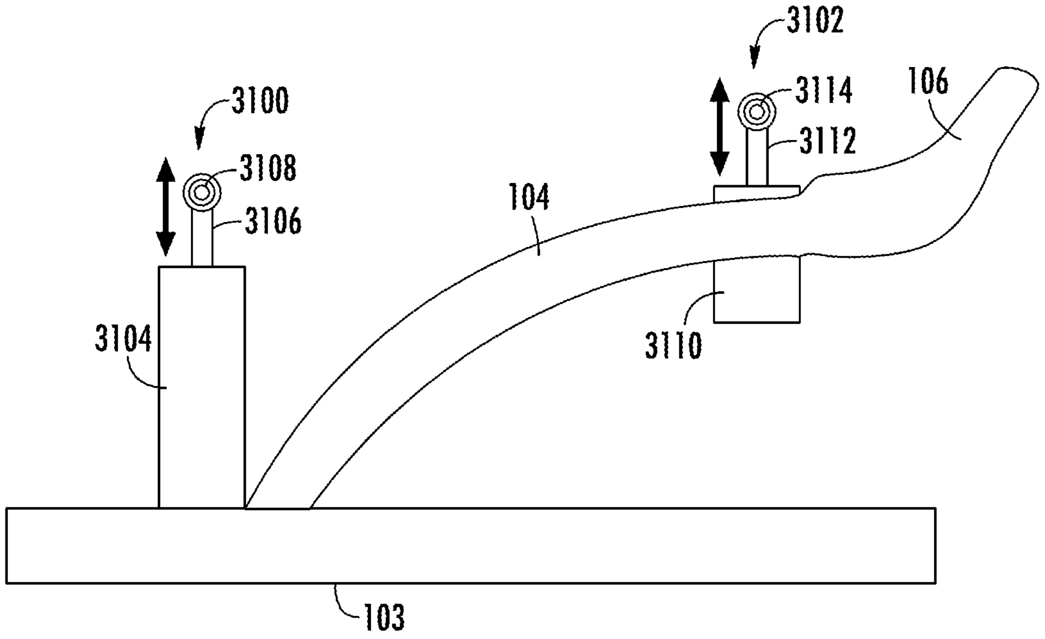
FIG. 31 is a side view of a fourteenth alternative embodiment of a height adjustment mechanism for the exercise and therapeutic device of FIG. 1, according to an exemplary embodiment.

Referring now to FIG. 31, a fourteenth exemplary embodiment of the exercise and therapeutic device 100 is shown. In FIG. 31, the device 100 includes a rear actuator column 3100 and a front actuator column 3102. The rear actuator column 3100 is positioned proximate a rear of the device 100 and is configured to support a rear peg 160 of the user seal frame 136. The rear actuator column 3100 includes a base 3104, a shaft 3106 extending upwards from the base 3104, and a receptacle 3108 (tray, notch, clamp) positioned at or near a top end of the shaft 3106. The receptacle 3108 is configured to receive and hold the rear peg 160. The shaft 3106 is configured to be controllably extended from the base 3104 and retracted into the base 3104 under the control of an actuator housed within the base 3104, thereby adjusting the position of the receptacle 3108 (and a rear peg 160 held by the receptacle 3108).

In the embodiment shown, the actuator is electronically controlled, for example by the controller 110. The actuator may include a linear actuator, a jack (e.g., a hydraulic jack, a pneumatic jack), or other mechanism configured to extend and retract the shaft 3106 from the base 3104 in order to move the receptacle 3108 to a desired position, and to secure the shaft 3106 in a given position during use of the device 100. The actuator can be controlled by user input to the user console 106 and/or to one or more buttons, knobs, etc. that can be positioned on the base 3104. In some cases, the actuator is controlled in response indicating a height of the user. In other embodiments, the position of the shaft 3106 can be manually adjusted by a user, for example by manipulating a hand crank (e.g., wheel) positioned on the base 3104 and mechanically linked to the shaft 3106. The rear actuator column 3100 is thereby configured to provide for height adjustment of the user seal frame 136 relative to the running surface.

The front actuator column 3102 includes a base 3110, a shaft 3112 extending upwards from the base 3110, and a receptacle 3114 (tray, notch, clamp) positioned at or near a top end of the shaft 3112. The front actuator column 3102 is shown as coupled to and supported by the handrail assembly 104. In other embodiments, the front actuator column 3102 is coupled to and extends upwards from the treadmill frame 103. The receptacle 3114 is configured to receive and hold a front peg 158. The shaft 3112 is configured to be controllably extended from the base 3110 and retracted into the base 3110 under the control of an actuator housed within the base 3104, thereby adjusting the position of the height of the receptacle 3114 (and of the front peg 160 held by the receptacle 3108).

The actuator of the base 3110 of the front actuator column 3102 may be the same as or similar to the actuator of the rear actuator column 3102. In some embodiments, the actuators of the front actuator column 3102 and the rear actuator column 3102 are independently controllable, such that the height of the rear receptacle 3108 can be set independent of the height of the front receptacle 3114 and vice versa. In other embodiments, control of the actuators is coupled to maintain a geometric (spatial) relationship between the front receptacle 3114 and the rear receptacle 3108. For example, the spatial relationship between the front receptacle 3114 and the rear receptacle 3108 may be controlled to match a fixed (rigid) spatial relationship between the front pegs 158 and rear pegs 160 of the user seal frame 136 thereby ensuring that user seal frame 136 fits between and can be received by both the front actuator column 3102 and the rear actuator column 3102 even though the front pegs 158 and the rear pegs 160 cannot move relative to one another. Such automation may facilitate the user's ability to correctly position the user seal frame 136.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments and that such variations are intended to be encompassed by the present disclosure.

It is important to note that the constructions and arrangements of the exercise and therapeutic device 100 as shown in the various exemplary embodiments are illustrative only.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An offloading system for use with a treadmill, the offloading system comprising:

an air chamber configured to be selectively inflated between a deflated condition and an inflated, operating condition;

a user seal coupled to the air chamber and adapted to receive a user so that, in the operating condition, at least a portion of the user is received in the user seal and positioned within the air chamber;

a pump operable to inflate the air chamber; and a controller configured to determine an occurrence of a loss of pressure in the air chamber and, in response to the occurrence, cause a reduction of speed of a running belt of the treadmill.

2. The offloading system of claim 1, further comprising a sensor configured to acquire at least one measurement indicative of a pressure in the air chamber, wherein the controller is further programmed to control the pump based on the at least one measurement.

3. The offloading system of claim 1, wherein the controller is further programmed to control the pump based on two or more of a user's short size, a user's waist size, and a frame height setting.

4. The offloading system of claim 1, further comprising:

a column;

a pin lock coupled to the vertical column, wherein the pin lock is selectively adjustable in position along the column; and a user seal frame coupled to or configured to be received by the pin lock such that the user seal frame is adjustable in position along the column by movement of the pin lock along the column.

5. The offloading system of claim 1, further comprising:

a rack; and a user seal frame configured to be mounted on the rack and to restrict expansion of the air chamber;

wherein the rack is rotatable between a substantially upright position and a substantially horizontal position.

6. The offloading system of claim 1, further comprising a user seal frame configured to restrict expansion of the air chamber, wherein the user seal frame is movable along a handrail assembly of the treadmill.

7. The offloading system of claim 1, further comprising a linear actuator and a user seal frame coupled to the linear actuator, wherein the linear actuator is configured to move the user seal frame, and wherein the user seal frame restricts expansion of the air chamber.

8. An offloading system for an exercise or rehabilitation device, comprising:

an air chamber;

a user seal coupled to the air chamber and configured to selectively receive a portion of a user so that, in an operating condition, the portion of the user is received within the air chamber;

a sensor configured to acquire at least one measurement indicative of a pressure in the air chamber, the at least one measurement comprising a pressure fluctuation component caused by movement of the user;

a pump operable to selectively inflate the air chamber; and a controller configured to control the pump based on the at least one measurement by filtering out the pressure fluctuation component caused by the movement of the user.

9. The offloading system of claim 8, wherein the controller is further configured to determine an occurrence of a loss of pressure in the air chamber and, in response to the occurrence, cause a reduction in operation of the exercise or rehabilitation device used with the offloading system.

10. The offloading system of claim 8, further comprising:

a column;

a pin lock coupled to the column, wherein the pin lock is selectively adjustable in position along the column; and a user seal frame coupled to or configured to be received by the pin lock such that the user seal frame is adjustable in position along the column by movement of the pin lock along the column.

11. The offloading system of claim 8, further comprising:

a rack; and a user seal frame coupled to the rack that restricts expansion of the air chamber;

wherein the rack is rotatable between a substantially upright position and a substantially horizontal position.

12. The offloading system of claim 8, further comprising:

a user seal frame configured to restrict expansion of the air chamber and comprising a peg; and a mount configured to allow adjustment of the peg in at least two dimensions.

13. The offloading system of claim 8, further comprising a user seal frame configured to restrict expansion of the air chamber, wherein the user seal frame is movable along a handrail assembly of the exercise or rehabilitation device.

14. The offloading system of claim 8, further comprising a linear actuator and a user seal frame coupled to the linear actuator such that the linear actuator is configured to move the user seal frame, wherein the user seal frame restricts expansion of the air chamber.

15. An offloading system, comprising:

an air chamber;

a user seal coupled to the air chamber and configured to selectively receive a portion of a user so that, in an operating condition, the portion of the user is received within the air chamber;

a pump operable to selectively inflate the air chamber;

a column;

a pin lock coupled to the column, wherein the pin lock is selectively adjustable in position along the column, wherein the pin lock comprises a collar, a pin extending through the collar, and a slot or hook coupled to the collar; and a user seal frame coupled to the pin lock such that the user seal frame is adjustable in position along the column by movement of the pin lock along the column, wherein the user seal frame comprises a peg; and wherein the slot or hook of the pin lock is configured to receive the peg of the user seal frame.

16. The offloading system of claim 15, further comprising a controller configured to determine an occurrence of a loss of pressure in the air chamber and, in response to the occurrence, cause a reduction in operation of an exercise equipment in use with the offloading system.

17. The offloading system of claim 15, further comprising:

a sensor configured to acquire at least one measurement indicative of a pressure in the air chamber; and a controller programmed to control the pump based on the at least one measurement.

18. An offloading system, comprising:

an air chamber;

a user seal coupled to the air chamber and configured to selectively receive a portion of a user so that, in an operating condition, the portion of the user is received within the air chamber:

a pump operable to selectively inflate the air chamber;

a column;

a pin lock coupled to the column, wherein the pin lock is selectively adjustable in position along the column;

a user seal frame coupled to the pin lock such that the user seal frame is adjustable in position along the column by movement of the pin lock along the column, and a controller programmed to control the pump at least partly based on a waist or shorts size of the user.

* * * * *